(12) United States Patent
Inoue et al.

(10) Patent No.: US 11,947,105 B2
(45) Date of Patent: Apr. 2, 2024

(54) PROJECTION APPARATUS AND CONTROL METHOD

(71) Applicant: FUJIFILM Corporation, Tokyo (JP)

(72) Inventors: Kazuki Inoue, Saitama (JP); Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 20 days.

(21) Appl. No.: 17/749,624

(22) Filed: May 20, 2022

(65) Prior Publication Data

US 2022/0373782 A1    Nov. 24, 2022

(30) Foreign Application Priority Data

May 21, 2021   (JP) ................................ 2021-086418

(51) Int. Cl.
*G02B 26/08* (2006.01)
*G02B 27/09* (2006.01)
(Continued)

(52) U.S. Cl.
CPC ..... *G02B 26/0816* (2013.01); *G02B 27/0905* (2013.01); *G02B 27/0972* (2013.01);
(Continued)

(58) Field of Classification Search
CPC .... G03B 21/006; G03B 21/008; G03B 21/28; G03B 21/142; G03B 21/2013; G03B 21/2033; G03B 21/2053; G03B 21/2066; G02B 27/0905; G02B 27/0972; G02B 27/0977; G02B 26/0816; G02B 26/0825; G02B 26/0833; H04N 9/315; H04N 9/3105; H04N 9/3126; H04N 9/3141; H04N 9/3152; H04N 9/3155
See application file for complete search history.

(56) References Cited

U.S. PATENT DOCUMENTS 6,176,585 B1 *   1/2001   Koyama .............. H04N 9/3105
                                                    353/31
8,157,389 B2 *   4/2012   Maeda .................. G03B 33/06
                                                    257/89
(Continued)

FOREIGN PATENT DOCUMENTS

JP   2013-152384 A   8/2013
JP   2018-169426 A   11/2018
JP   2020-027117 A   2/2020

*Primary Examiner* — Sultan Chowdhury
(74) *Attorney, Agent, or Firm* — Birch, Stewart, Kolasch & Birch, LLP

(57) ABSTRACT

A projection apparatus includes a light source, a light modulation portion, a first mirror, a second mirror, a third mirror, a fourth mirror, and a projection optical system. The light source performs irradiation with light. The light modulation portion modulates the light from the light source. The first mirror, the second mirror, the third mirror, and the fourth mirror reflect an optical image modulated by the light modulation portion. The projection optical system projects the optical image reflected by the first mirror, the second mirror, the third mirror, and the fourth mirror to a projection surface of a projection target object. The first mirror, the second mirror, the third mirror, and the fourth mirror are arranged between the light modulation portion and the projection optical system.

22 Claims, 25 Drawing Sheets

(51) Int. Cl.
*G03B 21/00* (2006.01)
*G03B 21/14* (2006.01)
*G03B 21/20* (2006.01)

(52) U.S. Cl.
CPC ....... *G02B 27/0977* (2013.01); *G03B 21/006* (2013.01); *G03B 21/142* (2013.01); *G03B 21/2066* (2013.01); *G03B 21/2033* (2013.01)

(56) References Cited

U.S. PATENT DOCUMENTS

| | | | |
|---|---|---|---|
| 8,585,217 B2 * | 11/2013 | Lee | H04N 9/3141 |
| | | | 353/30 |
| 2010/0053737 A1 * | 3/2010 | Fujita | G02B 17/0852 |
| | | | 359/364 |
| 2011/0267588 A1 * | 11/2011 | Dai | G03B 21/28 |
| | | | 353/98 |
| 2014/0333900 A1 | 11/2014 | Aboshi et al. | |
| 2018/0033123 A1 * | 2/2018 | Narimatsu | G03B 21/26 |

\* cited by examiner

FIG. 13
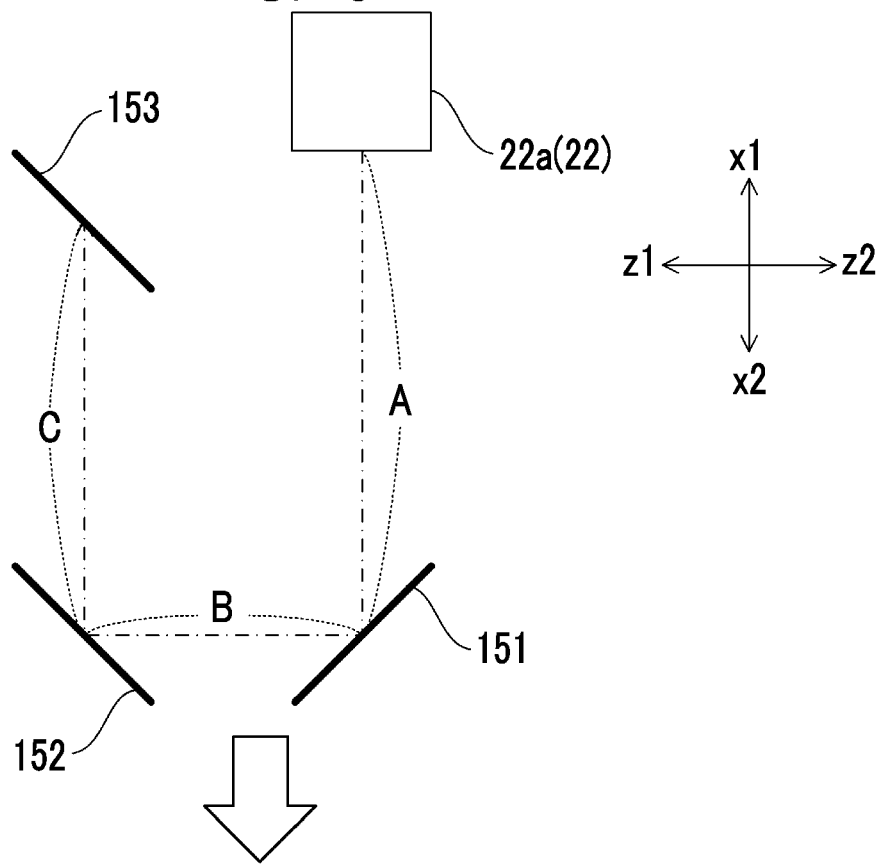
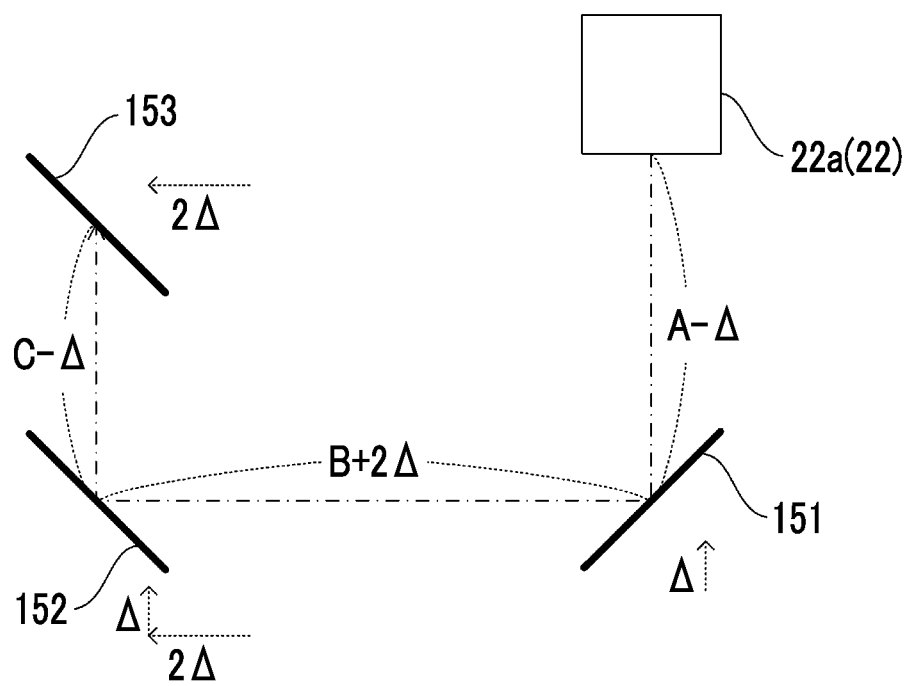

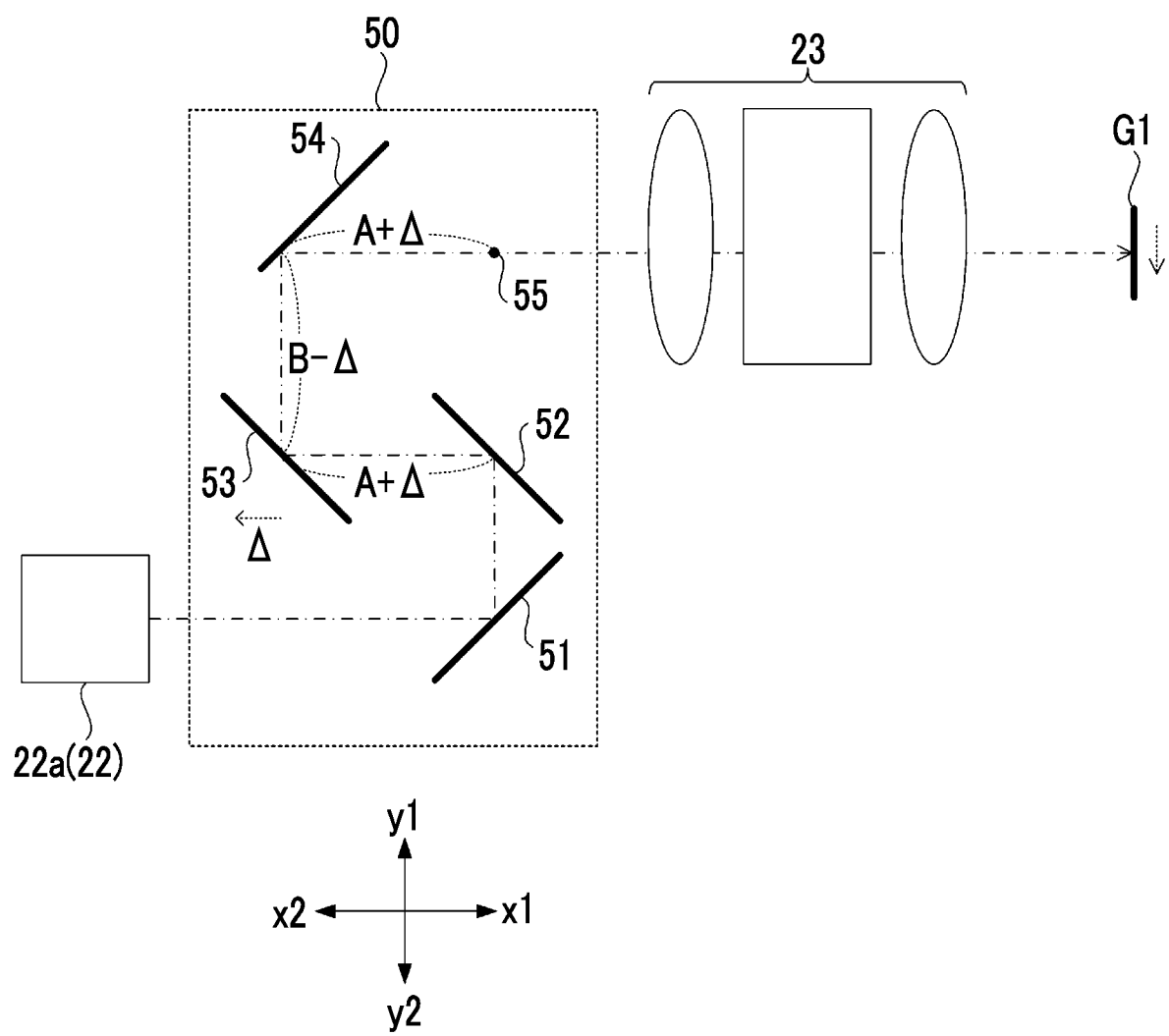

PROJECTION APPARATUS AND CONTROL METHOD

CROSS-REFERENCE TO RELATED APPLICATIONS

This application is based upon and claims the benefit of priority from prior Japanese patent application No. 2021-086418, filed on May 21, 2021, the entire contents of which are incorporated herein by reference.

BACKGROUND OF THE INVENTION

1. Field of the Invention

The present invention relates to a projection apparatus and a control method.

2. Description of the Related Art

JP2013-152384A discloses a projection display device in which in a configuration of causing each color light obtained by expanding a beam by a beam expansion portion to be incident on an integrator formed with a fly eye lens through a beam irradiation position displacement portion, the beam irradiation position displacement portion moves a position of laser light incident on the integrator by parallelly displacing a mirror by a driving portion.

JP2018-169426A discloses a projector comprising a light source unit in which a light source is accommodated, a projection unit that forms an image by modulating light emitted from the light source unit and projects the formed image, and a light guide path on which the light emitted from the light source unit is guided to the projection unit, in which a distance between the light source unit and the projection unit can be changed by comprising a plurality of sliding members on the light guide path.

JP2020-027117A discloses a projection display system in which a direction of light transmitted through a relay lens from a light modulation element is changed by a first mirror and a second mirror, and the light is transmitted through a lens and projected to a screen. The projection display system comprises a mirror rotation portion that changes an inclination of the second mirror.

SUMMARY OF THE INVENTION

One embodiment according to the disclosed technology provides a projection apparatus and a control method that can shift a projection range while suppressing a decrease in projection quality.

A projection apparatus according to an aspect of the present invention comprises an irradiation portion that performs irradiation with light, a light modulation element that modulates the light from the irradiation portion, a plurality of reflective portions that reflect an optical image modulated by the light modulation element, and a projection optical system that projects the optical image reflected by the plurality of reflective portions to a projection surface, in which the plurality of reflective portions are arranged between the light modulation element and the projection optical system.

A control method according to another aspect of the present invention is a control method by a projection apparatus including an irradiation portion that performs irradiation with light, a light modulation element that modulates the light from the irradiation portion, a plurality of reflective portions that reflect an optical image modulated by the light modulation element, and a projection optical system that projects the optical image reflected by the plurality of reflective portions to a projection surface, and a processor, the control method comprising arranging the plurality of reflective portions between the light modulation element and the projection optical system, and performing, by the processor, a control of changing a position of a projection range of the optical image by displacing at least one of the plurality of reflective portions.

According to the present invention, a projection apparatus and a control method that can shift a projection range while suppressing a decrease in projection quality can be provided.

BRIEF DESCRIPTION OF THE DRAWINGS

FIG. 13 is a diagram illustrating an example of shifting of the projection range 11 in a direction z by the second shift mechanism 50 illustrated in FIG. 11.

FIG. 25 is a diagram illustrating an example of shifting of the projection range 11 by the second shift mechanism 50 illustrated in FIG. 24 for reference.

DESCRIPTION OF THE PREFERRED EMBODIMENTS

Hereinafter, an example of an embodiment of the present invention will be described with reference to the drawings.

Embodiment

Schematic Configuration of Projection Apparatus 10 of Embodiment

Figure 1:
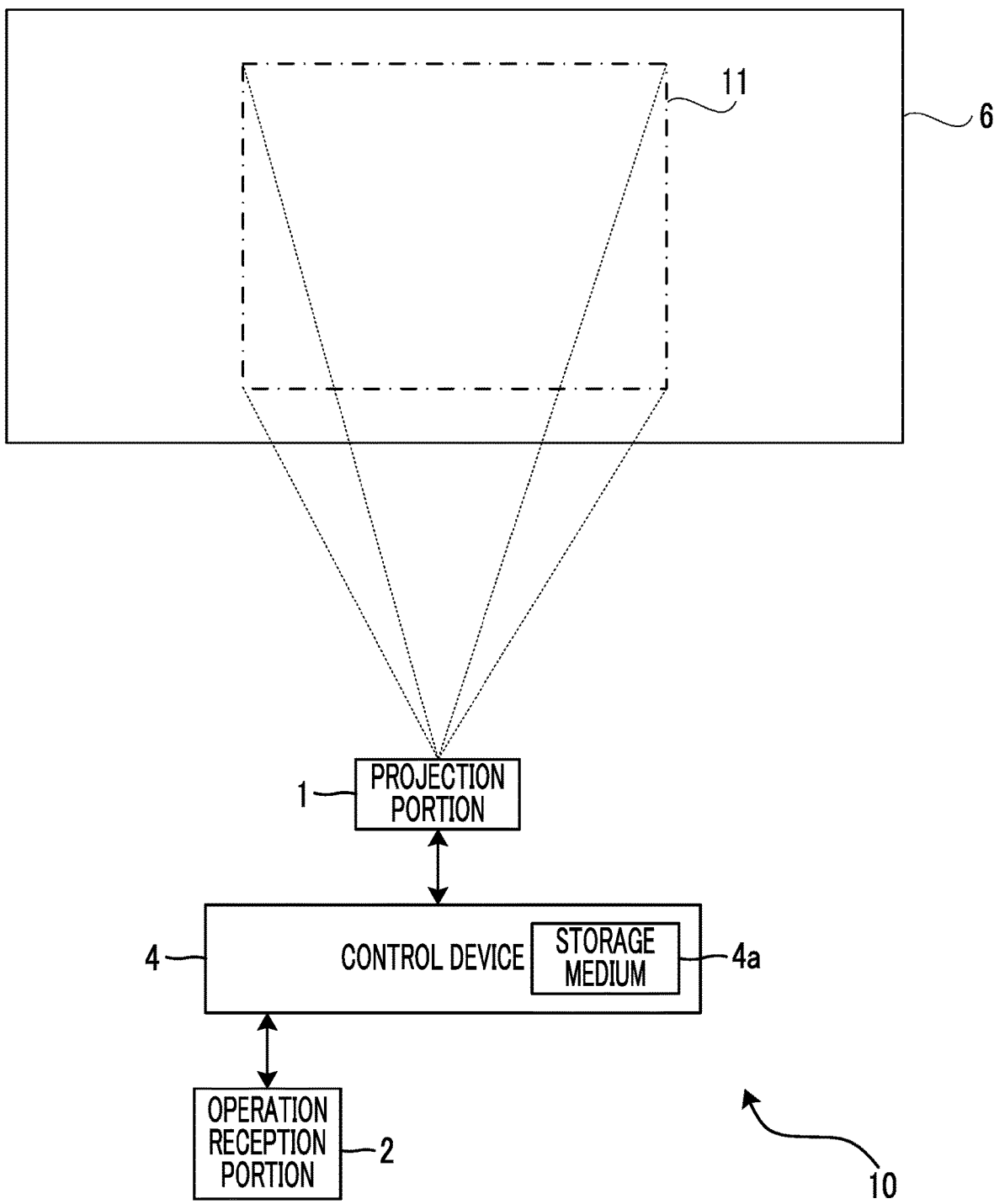
FIG. 1 is a schematic diagram illustrating a schematic configuration of a projection apparatus 10 of an embodiment.

FIG. 1 is a schematic diagram illustrating a schematic configuration of a projection apparatus 10 of the embodiment.

The projection apparatus 10 comprises a projection portion 1, a control device 4, and an operation reception portion 2. The projection portion 1 is configured with, for example, a liquid crystal projector or a projector using liquid crystal on silicon (LCOS). Hereinafter, the projection portion 1 will be described as a liquid crystal projector.

The control device 4 controls projection performed by the projection apparatus 10. The control device 4 is a device including a control portion configured with various processors, a communication interface (not illustrated) for communicating with each portion, and a storage medium 4a such as a hard disk, a solid state drive (SSD), or a read only memory (ROM) and generally controls the projection portion 1. Examples of the various processors of the control portion of the control device 4 include a central processing unit (CPU) that is a general-purpose processor performing various processing by executing a program, a programmable logic device (PLD) such as a field programmable gate array (FPGA) that is a processor having a circuit configuration changeable after manufacturing, or a dedicated electric circuit such as an application specific integrated circuit (ASIC) that is a processor having a circuit configuration dedicatedly designed to execute specific processing.

More specifically, a structure of these various processors is an electric circuit in which circuit elements such as semiconductor elements are combined. The control portion of the control device 4 may be configured with one of the various processors or may be configured with a combination of two or more processors of the same type or different types (for example, a combination of a plurality of FPGAs or a combination of a CPU and an FPGA).

The operation reception portion 2 detects an instruction (user instruction) from a user by receiving various operations from the user. In the present embodiment, the operation reception portion 2 is an operating part such as a button, a key, or a joystick provided in a main body of the projection apparatus 10. Accordingly, in a case where the operation reception portion 2 is operated, it can be determined that the user is positioned near the projection apparatus 10.

A projection target object 6 is an object such as a screen having a projection surface on which a projection image is displayed by the projection portion 1. In the example illustrated in FIG. 1, a projection surface of the projection target object 6 is a rectangular plane. It is assumed that upper, lower, left, and right sides of the projection target object 6 in FIG. 1 are upper, lower, left, and right sides of the actual projection target object 6.

A projection range 11 illustrated by a dot dashed line is a region that is irradiated with projection light by the projection portion 1 in the projection target object 6. In the example illustrated in FIG. 1, the projection range 11 is rectangular. The projection range 11 is a part or the entirety of a projectable range within which the projection can be performed by the projection portion 1.

Figure 3:
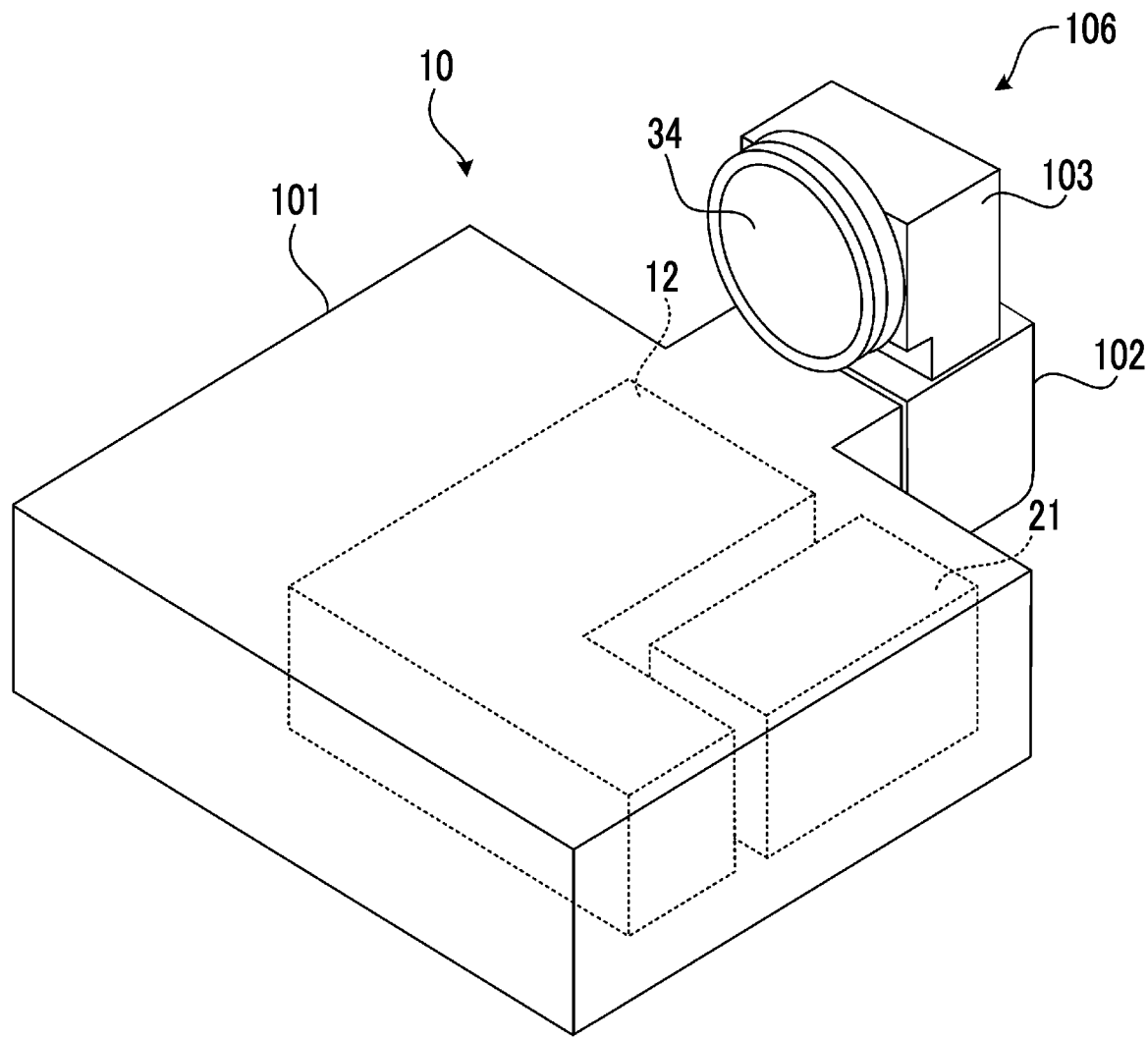
FIG. 3 is a schematic diagram illustrating an exterior configuration of the projection apparatus 10.
Figure 4:
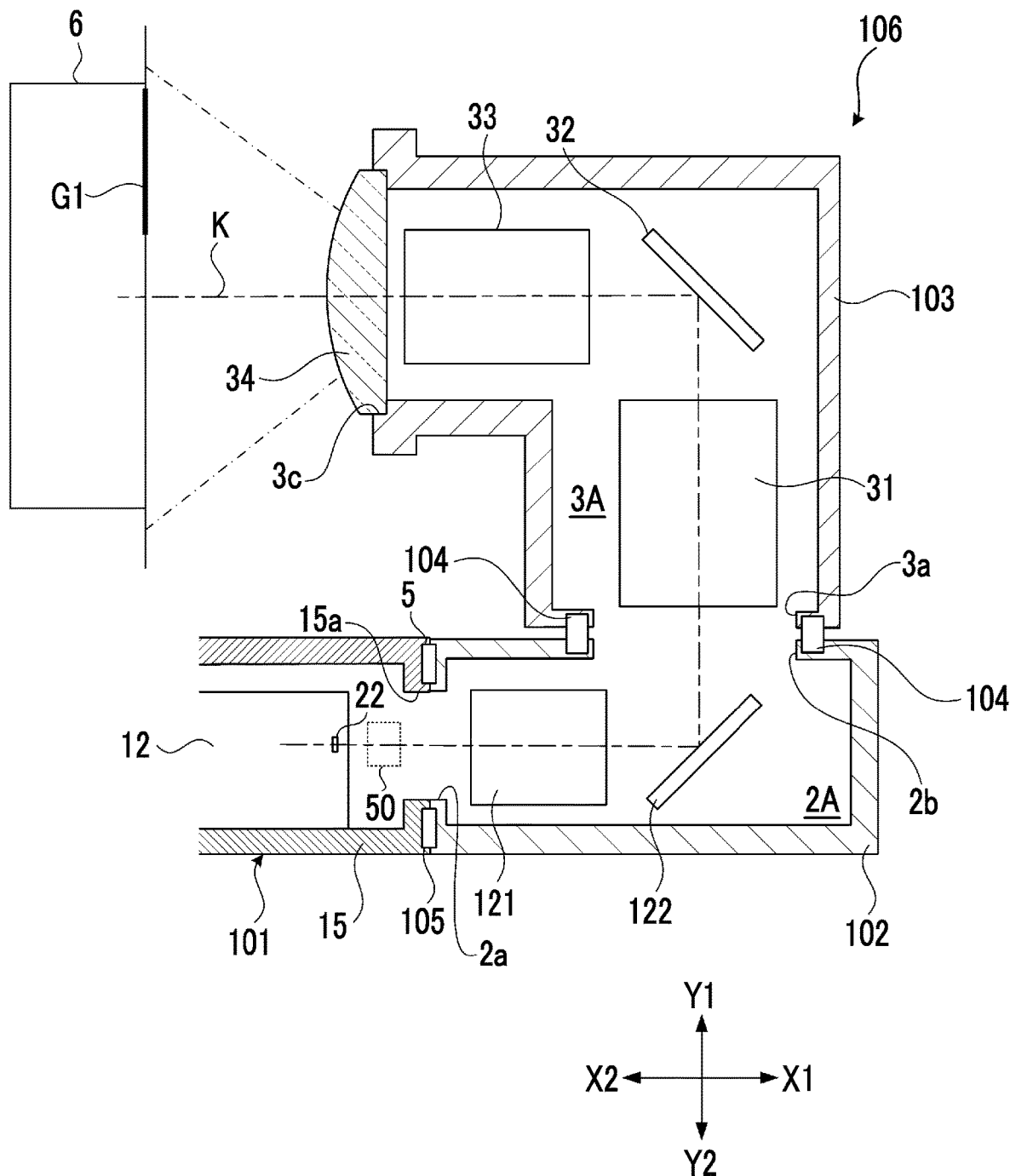
FIG. 4 is a schematic cross-sectional view of an optical unit 106 of the projection apparatus 10 illustrated in FIG. 3.

The projection portion 1, the control device 4, and the operation reception portion 2 are implemented by, for example, one device (for example, refer to FIG. 3 and FIG. 4). Alternatively, the projection portion 1, the control device 4, and the operation reception portion 2 may be separate devices that cooperate by communicating with each other.

Internal Configuration of Projection Portion 1 Illustrated in FIG. 1

Figure 2:
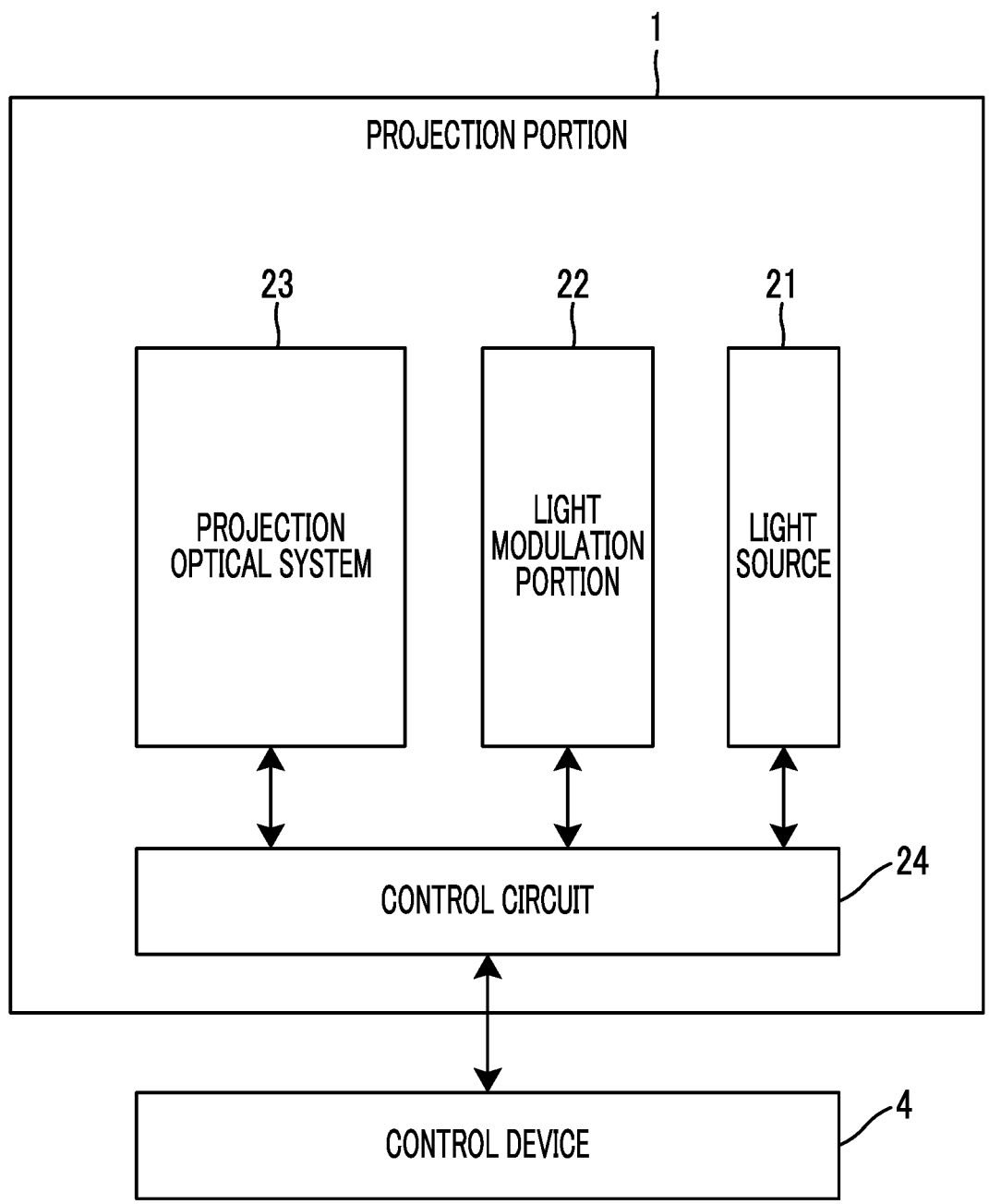
FIG. 2 is a schematic diagram illustrating an example of an internal configuration of a projection portion 1 illustrated in FIG. 1.

FIG. 2 is a schematic diagram illustrating an example of an internal configuration of the projection portion 1 illustrated in FIG. 1.

As illustrated in FIG. 2, the projection portion 1 comprises a light source 21, a light modulation portion 22, a projection optical system 23, and a control circuit 24. The light source 21 includes a light emitting element such as a laser or a light emitting diode (LED) and emits, for example, white light. The light source 21 is an example of an irradiation portion that performs irradiation with light.

The light modulation portion 22 is configured with three liquid crystal panels (light modulation elements) that emit each color image by modulating, based on image information, each color light which is emitted from the light source 21 and is separated into three colors of red, blue, and green by a color separation mechanism, not illustrated, and a dichroic prism that mixes each color image emitted from the three liquid crystal panels and emits the mixed color image in the same direction. Filters of red, blue, and green may be mounted in each of the three liquid crystal panels, and each color image may be emitted by modulating the white light emitted from the light source 21 in each liquid crystal panel.

The light from the light source 21 and the light modulation portion 22 is incident on the projection optical system 23. The projection optical system 23 includes at least one lens and is configured with, for example, a relay optical system. The light that has passed through the projection optical system 23 is projected to the projection target object 6.

In the projection target object 6, a region irradiated with the light transmitted through the entire range of the light modulation portion 22 is the projectable range within which the projection can be performed by the projection portion 1. In the projectable range, a region that is actually irradiated with the light transmitted through the light modulation portion 22 is the projection range 11. For example, in the projectable range, a size, a position, and a shape of the projection range 11 are changed by controlling a size, a position, and a shape of a region through which the light is transmitted in the light modulation portion 22.

The control circuit 24 projects an image based on display data to the projection target object 6 by controlling the light source 21, the light modulation portion 22, and the projection optical system 23 based on the display data input from the control device 4. The display data input into the control circuit 24 is configured with three constituents of red display data, blue display data, and green display data.

In addition, the control circuit 24 enlarges or reduces the projection range 11 (refer to FIG. 1) of the projection portion 1 by changing the projection optical system 23 based on an instruction input from the control device 4. In addition, the control device 4 may move the projection range 1 of the projection portion 1 by changing the projection optical system 23 based on an operation received by the operation reception portion 2 from the user.

In addition, the projection apparatus 10 comprises a shift mechanism that mechanically or optically moves the projection range 11 while maintaining an image circle of the projection optical system 23. The image circle of the projection optical system 23 is a region in which the projection light incident on the projection optical system 23 appropriately passes through the projection optical system 23 in terms of a light fall-off, color separation, edge part curvature, or the like.

The shift mechanism is implemented by at least one of an optical system shift mechanism that performs optical system shifting, or an electronic shift mechanism that performs electronic shifting.

The optical system shift mechanism is, for example, a mechanism (for example, refer to FIG. 3 and FIG. 4) that moves the projection optical system 23 in a direction perpendicular to an optical axis, or a mechanism that moves the light modulation portion 22 in the direction perpendicular to the optical axis instead of moving the projection optical system 23. In addition, the optical system shift mechanism may perform the movement of the projection optical system 23 and the movement of the light modulation portion 22 in combination.

The electronic shift mechanism is a mechanism that performs pseudo shifting of the projection range 11 by changing a range through which the light is transmitted in the light modulation portion 22.

In addition, the projection apparatus 10 may comprise a projection direction changing mechanism that moves the image circle of the projection optical system 23 and the projection range 11. The projection direction changing mechanism is a mechanism that changes a projection direction of the projection portion 1 by changing a direction of the projection portion 1 by mechanical rotation (for example, refer to FIG. 3 and FIG. 4).

Mechanical Configuration of Projection Apparatus 10

FIG. 3 is a schematic diagram illustrating an exterior configuration of the projection apparatus 10. FIG. 4 is a schematic cross-sectional view of an optical unit 106 of the projection apparatus 10 illustrated in FIG. 3. FIG. 4 illustrates a cross section in a plane along an optical path of the light emitted from a body part 101 illustrated in FIG. 3.

As illustrated in FIG. 3, the projection apparatus 10 comprises the body part 101 and the optical unit 106 that is provided to protrude from the body part 101. In the configuration illustrated in FIG. 3, the operation reception portion 2, the control device 4, and the light source 21, the light modulation portion 22, and the control circuit 24 in the projection portion 1 are provided in the body part 101. The projection optical system 23 in the projection portion 1 is provided in the optical unit 106.

The optical unit 106 comprises a first member 102 supported by the body part 101 and a second member 103 supported by the first member 102.

The first member 102 and the second member 103 may be an integrated member. The optical unit 106 may be configured to be attachable to and detachable from the body part 101 (in other words, interchangeably configured).

The body part 101 includes a housing 15 (refer to FIG. 4) in which an opening 15a (refer to FIG. 4) for passing light is formed in a part connected to the optical unit 106.

As illustrated in FIG. 3, the light source 21 and a light modulation unit 12 including the light modulation portion 22 (refer to FIG. 2) that generates an image by spatially modulating the light emitted from the light source 21 based on input image data are provided inside the housing 15 of the body part 101.

The light emitted from the light source 21 is incident on the light modulation portion 22 of the light modulation unit 12 and is spatially modulated and emitted by the light modulation portion 22.

As illustrated in FIG. 4, the image formed by the light spatially modulated by the light modulation unit 12 is incident on the optical unit 106 through the opening 15a of the housing 15 and is projected to the projection target object 6 as a projection target object. Accordingly, an image G1 is visible from an observer.

As illustrated in FIG. 4, the optical unit 106 comprises the first member 102 including a hollow portion 2A connected to the inside of the body part 101, the second member 103 including a hollow portion 3A connected to the hollow portion 2A, a first optical system 121 and a reflective member 122 arranged in the hollow portion 2A, a second optical system 31, a reflective member 32, a third optical system 33, and a lens 34 arranged in the hollow portion 3A, a first shift mechanism 105, and a projection direction changing mechanism 104.

The first member 102 is a member having, for example, a rectangular cross-sectional exterior, in which an opening 2a and an opening 2b are formed in surfaces perpendicular to each other. The first member 102 is supported by the body part 101 in a state where the opening 2a is arranged at a position facing the opening 15a of the body part 101. The light emitted from the light modulation portion 22 of the light modulation unit 12 of the body part 101 is incident into the hollow portion 2A of the first member 102 through the opening 15a and the opening 2a.

An incidence direction of the light incident into the hollow portion 2A from the body part 101 will be referred to as a direction X1. A direction opposite to the direction X1 will be referred to as a direction X2. The direction X1 and the direction X2 will be collectively referred to as a direction X. In addition, in FIG. 4, a direction from the front to the back of the page and an opposite direction will be referred to as a direction Z. In the direction Z, the direction from the front to the back of the page will be referred to as a direction Z1, and the direction from the back to the front of the page will be referred to as a direction Z2.

In addition, a direction perpendicular to the direction X and the direction Z will be referred to as a direction Y. In the direction Y, an upward direction in FIG. 4 will be referred to as a direction Y1, and a downward direction in FIG. 4 will be referred to as a direction Y2. In the example in FIG. 4, the projection apparatus 10 is arranged such that the direction Y2 is a vertical direction.

The projection optical system 23 illustrated in FIG. 2 is composed of a first optical system 121, a reflective member 122, a second optical system 31, a reflective member 32, a third optical system 33, and a lens 34. An optical axis K of the projection optical system 23 is illustrated in FIG. 4. The first optical system 121, the reflective member 122, the second optical system 31, the reflective member 32, the third optical system 33, and the lens 34 are arranged in this order from the light modulation portion 22 side along the optical axis K.

The first optical system 121 includes at least one lens and guides the light that is incident on the first member 102 from the body part 101 and travels in the direction X1, to the reflective member 122.

The reflective member 122 reflects the light incident from the first optical system 121 in the direction Y1. The reflective member 122 is configured with, for example, a mirror. In the first member 102, the opening 2b is formed on the optical path of the light reflected by the reflective member 122, and the reflected light travels to the hollow portion 3A of the second member 103 by passing through the opening 2b.

The second member 103 is a member having an approximately T-shaped cross-sectional exterior, in which an opening 3a is formed at a position facing the opening 2b of the first member 102. The light that has passed through the opening 2b of the first member 102 from the body part 101 is incident into the hollow portion 3A of the second member 103 through the opening 3a. The first member 102 and the second member 103 may have any cross-sectional exterior and are not limited to the above.

The second optical system 31 includes at least one lens and guides the light incident from the first member 102 to the reflective member 32.

The reflective member 32 guides the light incident from the second optical system 31 to the third optical system 33 by reflecting the light in the direction X2. The reflective member 32 is configured with, for example, a mirror.

The third optical system 33 includes at least one lens and guides the light reflected by the reflective member 32 to the lens 34.

The lens 34 is arranged in an end part of the second member 103 on the direction X2 side in the form of closing the opening 3c formed in this end part. The lens 34 projects the light incident from the third optical system 33 to the projection target object 6.

The projection direction changing mechanism 104 is a rotation mechanism that rotatably connects the second member 103 to the first member 102. By the projection direction changing mechanism 104, the second member 103 is configured to be rotatable about a rotation axis (specifically, the optical axis K) that extends in the direction Y. The projection direction changing mechanism 104 is not limited to an arrangement position illustrated in FIG. 4 as long as the projection direction changing mechanism 104 can rotate the optical system. In addition, the number of rotation mechanisms is not limited to one, and a plurality of rotation mechanisms may be provided.

The first shift mechanism 105 is a mechanism for moving the optical axis K of the projection optical system (in other words, the optical unit 106) in a direction (direction Y in FIG. 4) perpendicular to the optical axis K. Specifically, the first shift mechanism 105 is configured to be capable of changing a position of the first member 102 in the direction Y with respect to the body part 101. The first shift mechanism 105 may manually move the first member 102 or electrically move the first member 102.

FIG. 4 illustrates a state where the first member 102 is moved as far as possible to the direction Y1 side by the first shift mechanism 105. By moving the first member 102 in the direction Y2 by the first shift mechanism 105 from the state illustrated in FIG. 4, a relative position between a center of the image (in other words, a center of a display surface) formed by the light modulation portion 22 and the optical axis K changes, and the image G1 projected to the projection target object 6 can be shifted (translated) in the direction Y2.

The first shift mechanism 105 may be a mechanism that moves the light modulation portion 22 in the direction Y instead of moving the optical unit 106 in the direction Y. Even in this case, the image G1 projected to the projection target object 6 can be moved in the direction Y2.

In addition, as illustrated in FIG. 4, the projection apparatus 10 comprises a second shift mechanism 50 separately from the first shift mechanism 105. The second shift mechanism 50 is provided between the light modulation portion 22 and the projection optical system 23 (the first optical system 121, the reflective member 122, the second optical system 31, the reflective member 32, the third optical system 33, and the lens 34). In the example in FIG. 4, the second shift mechanism 50 is provided at a position between the light modulation portion 22 and the opening 15a in the body part 101.

As will be described later, the second shift mechanism 50 comprises a plurality of reflective portions and can change a position of the image G1 projected to the projection target object 6, that is, the projection range of an optical image, by displacing at least one of the plurality of reflective portions.

Configuration Example 1 of Second Shift Mechanism 50

Figure 5:
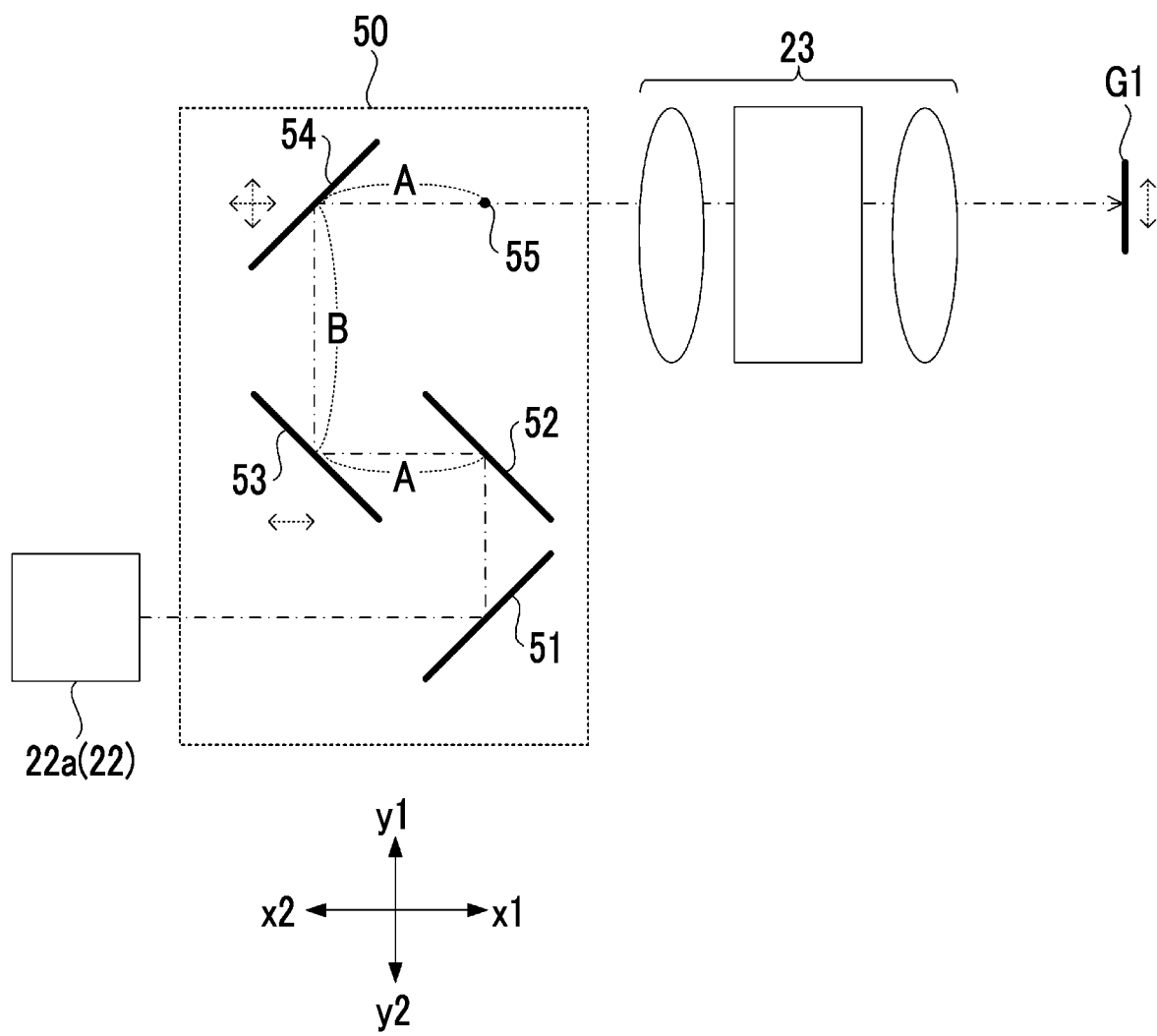
FIG. 5 is a diagram illustrating Configuration Example 1 of a second shift mechanism 50.

FIG. 5 is a diagram illustrating Configuration Example 1 of the second shift mechanism 50. In FIG. 5, the projection optical system 23 is illustrated in a simplified manner. A dichroic prism 22a illustrated in FIG. 5 is the dichroic prism comprised in the light modulation portion 22. The dichroic prism 22a is an example of a prism that is provided between the plurality of reflective portions (a first mirror 51, a second mirror 52, a third mirror 53, and a fourth mirror 54, described later) and the liquid crystal panels (light modulation elements) of the light modulation portion 22.

The incidence direction of the light (optical image) incident on the second shift mechanism 50 from the dichroic prism 22a will be referred to as a direction x1. A direction opposite to the direction x1 will be referred to as a direction x2. The direction x1 and the direction x2 will be collectively referred to as a direction x. The directions x, x1, and x2 correspond to the directions X, X1, and X2, respectively, in FIG. 4 at positions of the dichroic prism 22a and the second shift mechanism 50.

In addition, in FIG. 5, a direction from the front to the back of the page and an opposite direction will be referred to as a direction z. In the direction z, the direction from the front to the back of the page will be referred to as a direction z1, and the direction from the back to the front of the page will be referred to as a direction z2. The directions z, z1, and z2 correspond to the directions Z, Z1, and Z2, respectively, in FIG. 4 at the positions of the dichroic prism 22a and the second shift mechanism 50.

In addition, a direction perpendicular to the direction x and the direction z will be referred to as a direction y. In the direction y, an upward direction in FIG. 5 will be referred to as a direction y1, and a downward direction in FIG. 5 will be referred to as a direction y2. The directions y, y1, and y2 correspond to the directions Y, Y1, and Y2, respectively, in FIG. 4 at the positions of the dichroic prism 22a and the second shift mechanism 50.

In the example in FIG. 5, the second shift mechanism 50 comprises the first mirror 51, the second mirror 52, the third mirror 53, and the fourth mirror 54. The first mirror 51, the second mirror 52, the third mirror 53, and the fourth mirror 54 are an example of the plurality of reflective portions. The first mirror 51, the second mirror 52, the third mirror 53, and the fourth mirror 54 are formed by, for example, applying silver or aluminum to a surface of a substrate of resin.

The first mirror 51 reflects the light that is emitted in the direction x1 from the dichroic prism 22a, at an incidence angle (reflection angle) of 45 degrees to emit the light in the direction v.

The second mirror 52 reflects the light that is emitted in the direction y1 from the first mirror 51, at an incidence angle of 45 degrees to emit the light in the direction x2. The third mirror 53 reflects the light that is emitted in the direction x2 from the second mirror 52, at an incidence angle of 45 degrees to emit the light in the direction y1. The fourth mirror 54 reflects the light that is emitted in the direction y1 from the third mirror 53, at an incidence angle of 45 degrees to emit the light in the direction x1.

The light emitted from the fourth mirror 54 is projected by the projection optical system 23 as the image G1. For example, in the configuration example illustrated in FIG. 4, the light emitted from the fourth mirror 54 is projected to the projection target object 6 through the first optical system 121, the reflective member 122, the second optical system 31, the reflective member 32, the third optical system 33, and the lens 34 as the image G1.

In the example in FIG. 5, relative positions of the first mirror 51 and the second mirror 52 with respect to the dichroic prism 22a and the projection optical system 23 are fixed. Meanwhile, relative positions of the third mirror 53 and the fourth mirror 54 with respect to the dichroic prism 22a and the projection optical system 23 are variable. Specifically, the third mirror 53 can be displaced in the direction x, and the fourth mirror 54 can be displaced in the direction x and the direction y. The displacement of the third mirror 53 and the fourth mirror 54 is performed by controlling an actuator (for example, a motor), not illustrated, provided in the second shift mechanism 50 by the control device 4.

In the state in FIG. 5, A denotes an air-equivalent length of the optical path from the second mirror 52 to the third mirror 53. The air-equivalent length of the optical path is represented by a value (length/refractive index) obtained by dividing a length of the optical path in a passage direction of the light by a refractive index of the optical path. In the example in FIG. 5, air (refractive index=1) is present among the first mirror 51, the second mirror 52, the third mirror 53, and the fourth mirror 54, and the air-equivalent length of the optical path is the length (distance) of the optical path in the passage direction of the light.

In the state in FIG. 5, B denotes the air-equivalent length of the optical path from the third mirror 53 to the fourth mirror 54. In addition, a point at which a position in the direction x on the optical path from the fourth mirror 54 to the projection optical system 23 matches an incidence position of the light on the second mirror 52 is referred to as an imaginary point 55. In this case, the air-equivalent length of the optical path from the fourth mirror 54 to the imaginary point 55 is also A. Thus, the air-equivalent length of the optical path from the second mirror 52 to the imaginary point 55 is A+B+A=2A+B.

The control device 4 shifts the position of the image G1 (that is, the position of the projection range 11) by performing a control of displacing the first mirror 51 and the second mirror 52.

Shifting of Projection Range 11 by Second Shift Mechanism 50 Illustrated in FIG. 5

Figure 6:
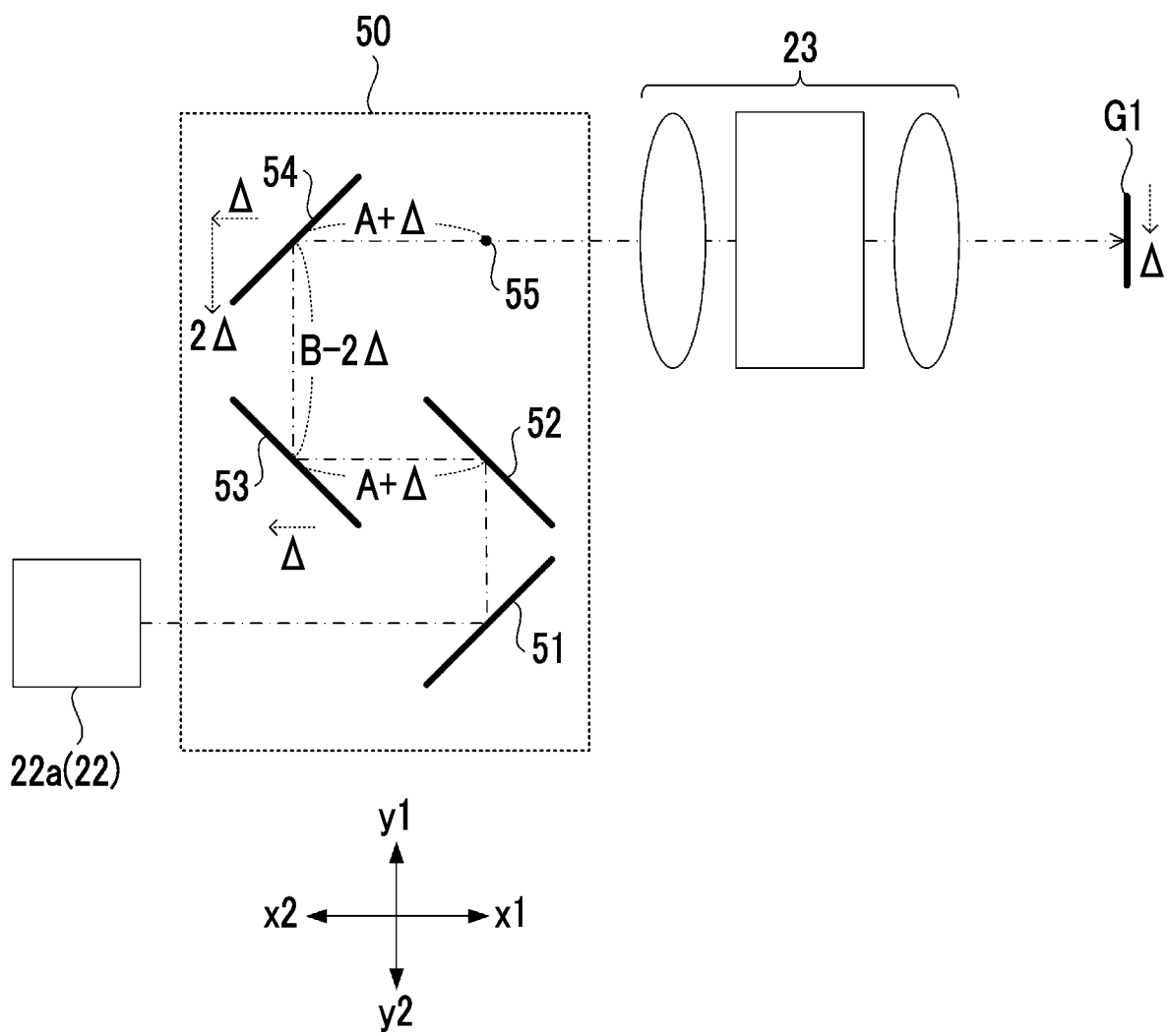
FIG. 6 is a diagram illustrating an example of shifting of a projection range 11 by the second shift mechanism 50 illustrated in FIG. 5.

FIG. 6 is a diagram illustrating an example of shifting of the projection range 11 by the second shift mechanism 50 illustrated in FIG. 5. In the example in FIG. 6, a control of displacing the third mirror 53 in the direction x2 and displacing the fourth mirror 54 in the direction x2 and the direction y2 is performed by the control device 4. Accordingly, the image G1 (that is, the projection range 11) can be shifted in the direction y2.

In addition, the control device 4 performs a control of not only displacing the fourth mirror 54 in the direction y2 but also displacing the third mirror 53 and the fourth mirror 54 in the direction x2. By doing so, a change in air-equivalent length of the optical path between the dichroic prism 22a and the projection optical system 23 in accordance with displacement of the image G1 can be suppressed.

Specifically, in the example illustrated in FIG. 6, the control device 4 performs a control of displacing the third mirror 53 and the fourth mirror 54 by Δ in the direction x2 and displacing the fourth mirror 54 by 2Δ in the direction y2. In this case, compared to the state in FIG. 5, the air-equivalent length of the optical path from the second mirror 52 to the third mirror 53 is increased by Δ. The air-equivalent length of the optical path from the third mirror 53 to the fourth mirror 54 is decreased by 2Δ. The air-equivalent length of the optical path from the fourth mirror 54 to the imaginary point 55 is increased by Δ.

Thus, in the example in FIG. 6, the air-equivalent length of the optical path from the second mirror 52 to the imaginary point 55 is (A+Δ)+(B−2Δ)+(A+Δ)=2A+B and is the same as in the state in FIG. 5. In addition, in the examples in FIG. 5 and FIG. 6, the air-equivalent length from the dichroic prism 22a to the second mirror 52 and the air-equivalent length from the imaginary point 55 to the projection optical system 23 are not changed.

Accordingly, even in a case where the image G1 is shifted in the direction y by transitioning from the state in FIG. 5 to the state in FIG. 6, the air-equivalent length of the optical path between the dichroic prism 22a and the projection optical system 23 can be maintained. Accordingly, unintended defocusing (for example, blurriness) of the image G1 due to a change in image forming position of the image G1 in the direction x can be suppressed. Thus, it is possible to shift the projection range 11 while suppressing a decrease in projection quality.

In the example in FIG. 6, while a case of displacing the third mirror 53 in the direction x2, displacing the fourth mirror 54 in the direction x2, and displacing the fourth mirror 54 in the direction y2 is described, each displacement may be sequentially performed in any order or may be performed in parallel. In addition, the image G1 can be shifted in the direction y1 by displacing the third mirror 53 and the fourth mirror 54 in a direction opposite to the example in FIG. 6.

In such a manner, in the projection apparatus 10, the first mirror 51, the second mirror 52, the third mirror 53, and the fourth mirror 54 (the plurality of reflective portions) that reflect the optical image modulated by the light modulation portion 22 are arranged between the light modulation portion 22 and the projection optical system 23. Accordingly, the position of the projection range 11 can be changed (shifted) by performing a control of displacing at least one of the first mirror 51, the second mirror 52, the third mirror 53, or the fourth mirror 54 (in the example in FIG. 6, the third mirror 53 and the fourth mirror 54).

In addition, by causing the control device 4 to perform this control such that the air-equivalent length of the optical path of the optical image between the light modulation portion 22 and the projection optical system 23 has a specific value (for example, the air-equivalent length of the optical path from the light modulation portion 22 to the projection optical system 23 in FIG. 5 and FIG. 6), unintended defocusing (for example, blurriness) of the image G1 in accordance with the shifting of the projection range 11 can be suppressed. Thus, it is possible to shift the projection range 11 while suppressing a decrease in projection quality.

For example, the operation reception portion 2 is a setting portion that sets the position of the projection range 11. For example, the operation reception portion 2 receives a designation of the position of the projection range 11 from the user by a key or the like and sets the received position of the projection range 11 as a position to which the projection range 11 is shifted. The control device 4 performs the control for shifting the projection range 11 based on the position of the projection range 11 set by the operation reception portion 2.

The setting portion that sets the position of the projection range 11 is not limited to the operation reception portion 2. For example, the projection apparatus 10 may comprise an imaging apparatus that can image the projection target object 6, and the control device 4 may automatically set the position of the projection range 11 based on a captured image obtained by the imaging apparatus. In this case, the imaging apparatus and the control device 4 are the setting portion that sets the position of the projection range 11.

Maintaining of Air-Equivalent Length of Optical Path

The control device 4 may perform the control for shifting the projection range 11 in a state where the air-equivalent length of the optical path between the light modulation portion 22 and the projection optical system 23 is maintained. The state where the air-equivalent length of the optical path is maintained is a state where a change in air-equivalent length of the optical path is decreased to an extent that defocusing of the image G1 due to the change in air-equivalent length of the optical path is not clearly recognized by the user.

Specifically, even in the middle of the control of transitioning from the state in FIG. 5 to the state in FIG. 6, the control device 4 maintains the air-equivalent length of the optical path from the second mirror 52 to the imaginary point 55 to be 2A+B by displacing the third mirror 53 and the fourth mirror 54 in a coordinating manner.

For example, in order to transition from the state in FIG. 5 to the state in FIG. 6, the control device 4 performs the displacement of the third mirror 53 by Δ in the direction x2, the displacement of the fourth mirror 54 by Δ in the direction x2, and the displacement of the fourth mirror 54 by 2A in the direction y2 at the same time over the same time period. At this point, a speed of the displacement of the third mirror 53 and the fourth mirror 54 in the direction x2 is denoted by V. and a speed of the displacement of the fourth mirror 54 by 2A in the direction y2 is denoted by V2. Accordingly, it is possible to transition from the state in FIG. 5 to the state in FIG. 6 while maintaining the air-equivalent length of the optical path from the second mirror 52 to the imaginary point 55 to be 2A+B.

Alternatively, in order to transition from the state in FIG. 5 to the state in FIG. 6, the control device 4 may include displacement of the third mirror 53 by Δ/N in the direction x2, displacement of the fourth mirror 54 by Δ/N in the direction x2, and displacement of the fourth mirror 54 by 2A/N in the direction y2 in one processing and repeat this processing N times. N is a natural number greater than or equal to 2. As N is increased, a change in air-equivalent length of the optical path from the second mirror 52 to the imaginary point 55 by one processing is decreased, and it is possible that the defocusing of the image G1 is not clearly recognized by the user. In such a manner, by repeating the processing of sequentially displacing the third mirror 53 and the fourth mirror 54, it is possible to transition from the state in FIG. 5 to the state in FIG. 6 while maintaining the air-equivalent length of the optical path from the second mirror 52 to the imaginary point 55 to be almost 2A+B, even in a case where each displacement is not performed at the same time.

Next, other configuration examples of the second shift mechanism 50 will be described.

Configuration Example 2 of Second Shift Mechanism 50

Figure 7:
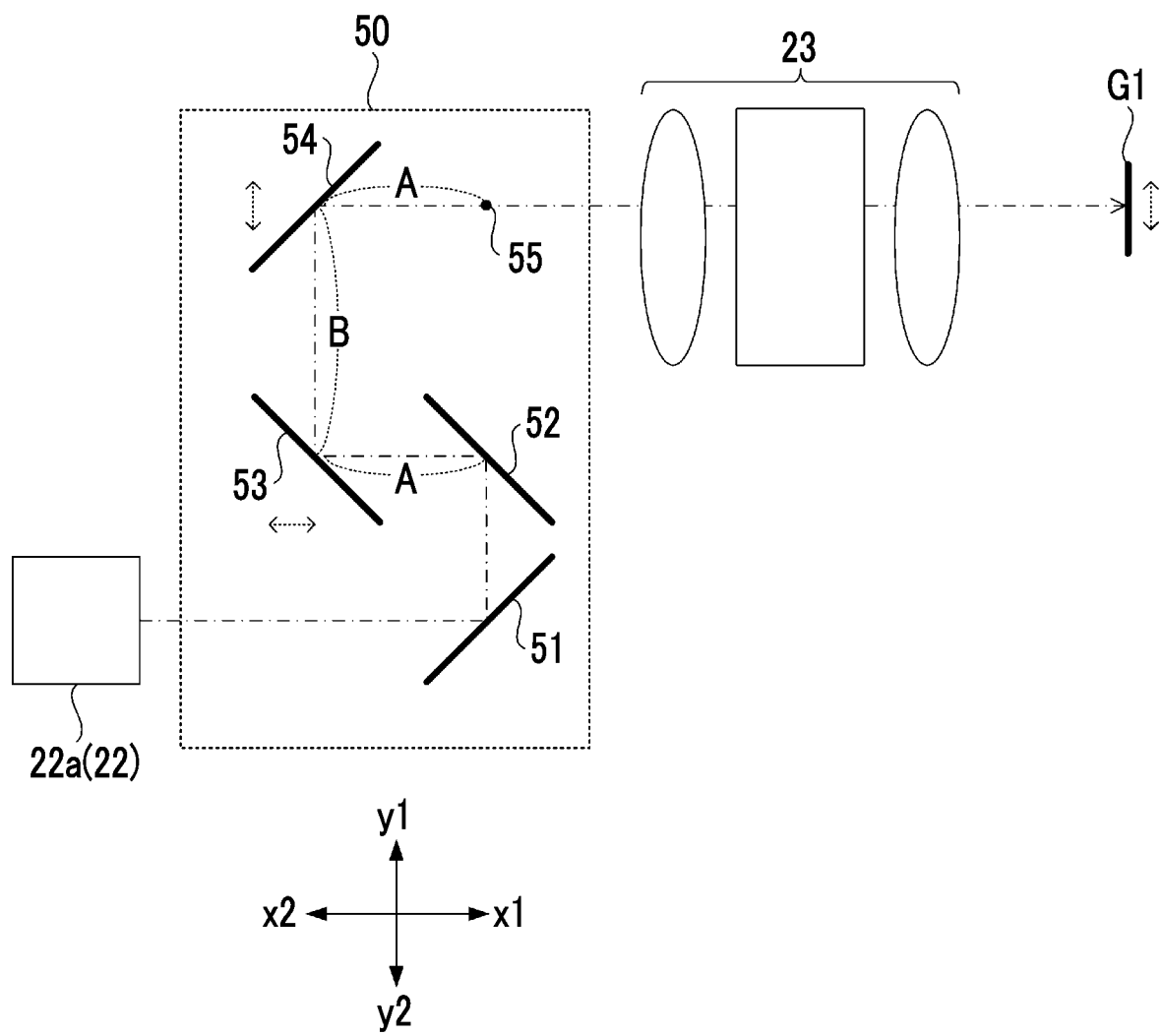
FIG. 7 is a diagram illustrating Configuration Example 2 of the second shift mechanism 50.

FIG. 7 is a diagram illustrating Configuration Example 2 of the second shift mechanism 50. In the example illustrated in FIG. 7, the fourth mirror 54 can be displaced in only the direction y.

Figure 8:
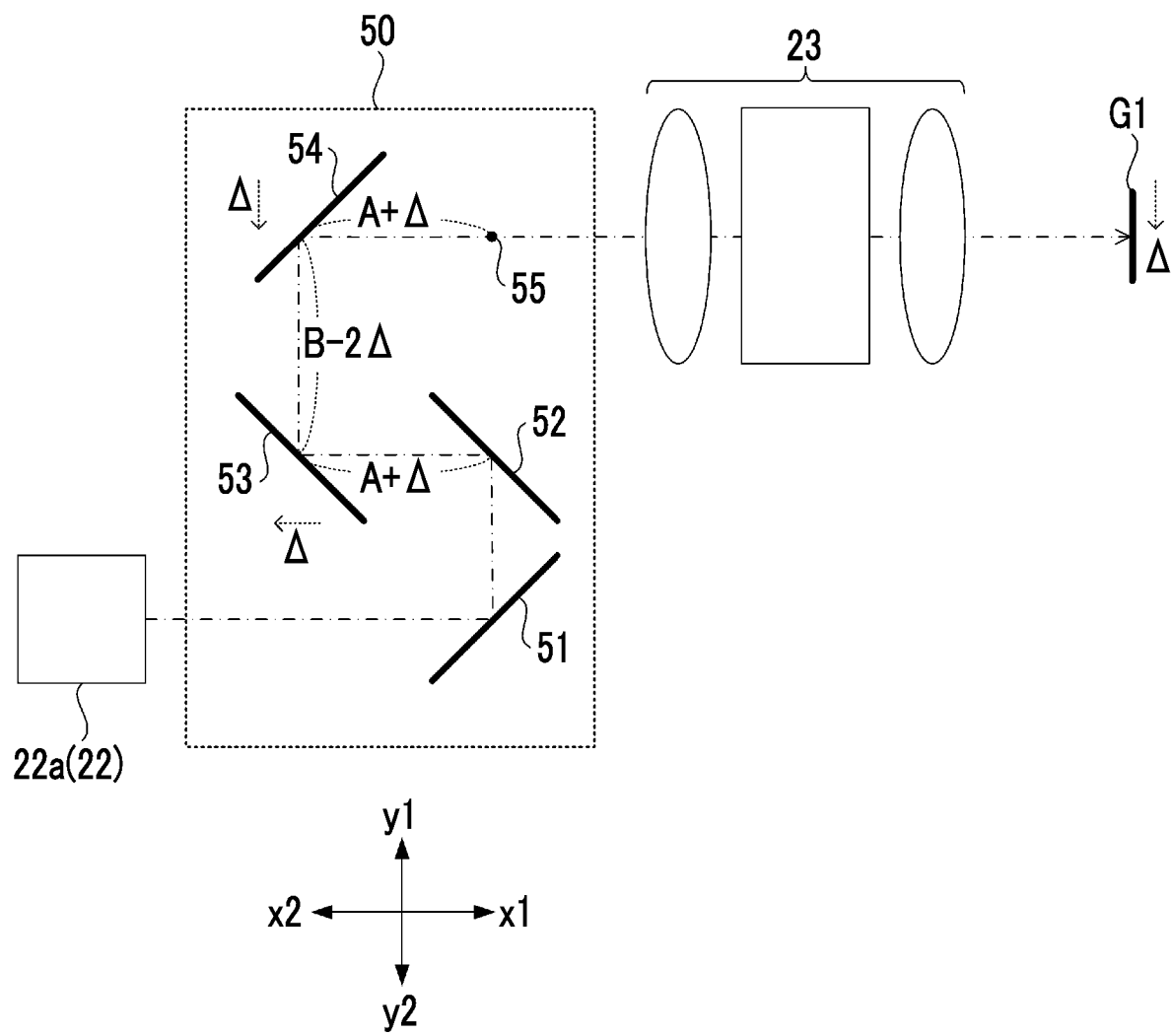
FIG. 8 is a diagram illustrating an example of shifting of the projection range 11 by the second shift mechanism 50 illustrated in FIG. 7.

Shifting of Projection Range 11 by Second Shift Mechanism 50 Illustrated in FIG. 7 FIG. 8 is a diagram illustrating an example of shifting of the projection range 11 by the second shift mechanism 50 illustrated in FIG. 7. In the example in FIG. 8, a control of displacing the third mirror 53 in the direction x2 and displacing the fourth mirror 54 in the direction y2 is performed by the control device 4. Accordingly, the image G1 (that is, the projection range 11) can be shifted in the direction y2.

Specifically, the control device 4 performs a control of displacing the third mirror 53 by Δ in the direction x2 and displacing the fourth mirror 54 by Δ in the direction y2. In this case, the incidence position of the light in the fourth mirror 54 is shifted by Δ in the direction x2 and Δ in the direction y2. Consequently, compared to the state in FIG. 7, the air-equivalent length of the optical path from the second mirror 52 to the third mirror 53 is increased by Δ. The air-equivalent length of the optical path from the third mirror 53 to the fourth mirror 54 is decreased by 2Δ. The air-equivalent length of the optical path from the fourth mirror 54 to the imaginary point 55 is increased by Δ.

Thus, in the example in FIG. 8, the air-equivalent length of the optical path from the second mirror 52 to the imaginary point 55 is (A+Δ)+(B−2Δ)+(A+Δ)=2A+B and is the same as in the state in FIG. 7. Thus, in the same manner as in the configuration example in FIG. 5 and FIG. 6, even in a case where the image G1 is shifted in the direction y, the air-equivalent length of the optical path between the dichroic prism 22a and the projection optical system 23 can be maintained. Accordingly, unintended blurriness or the like of the image G1 due to a change in image forming position of the image G1 in the direction x can be suppressed, and it is possible to shift the projection range 11 while suppressing a decrease in projection quality.

In the configuration example in FIG. 7 and FIG. 8, since the incidence position of the light in the fourth mirror 54 is shifted, an area of a reflecting surface of the fourth mirror 54 is designed to enable this shifting.

Configuration Example 3 of Second Shift Mechanism 50

Figure 9:
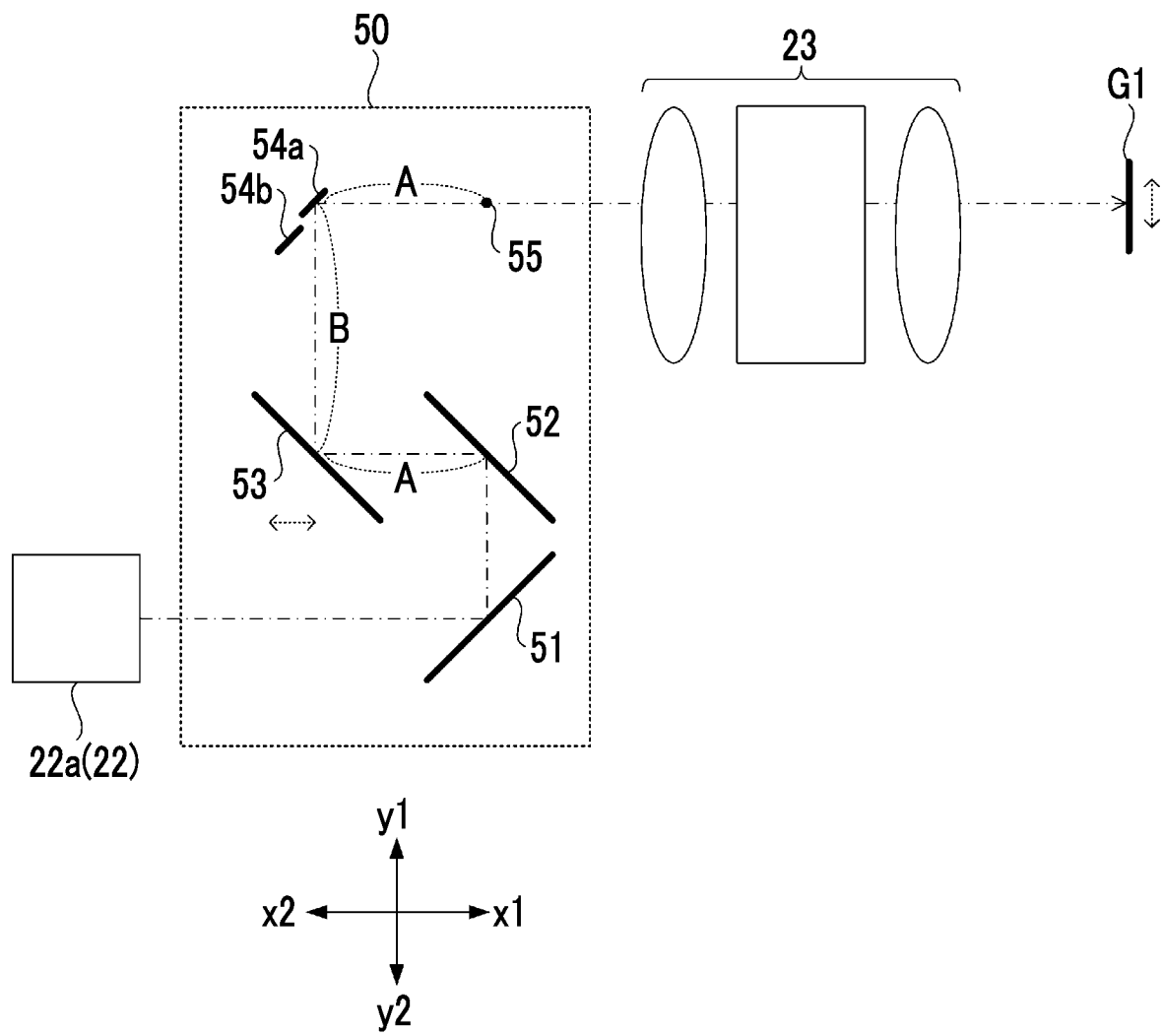
FIG. 9 is a diagram illustrating Configuration Example 3 of the second shift mechanism 50.

FIG. 9 is a diagram illustrating Configuration Example 3 of the second shift mechanism 50. In the example illustrated in FIG. 9, the second shift mechanism 50 comprises fourth mirrors 54a and 54b instead of the fourth mirror 54 illustrated in FIG. 5 to FIG. 8. Relative positions of the fourth mirrors 54a and 54b with respect to the dichroic prism 22a and the projection optical system 23 are fixed.

As illustrated in FIG. 9, when the air-equivalent length of the optical path from the second mirror 52 to the third mirror 53 is A, the fourth mirror 54a is provided at a position at which the light from the third mirror 53 is reflected at the same position as the fourth mirror 54 illustrated in FIG. 5. Meanwhile, when the air-equivalent length of the optical path from the second mirror 52 to the third mirror 53 is A+Δ, the fourth mirror 54b is provided at a position at which the light from the third mirror 53 is reflected at the same position as the fourth mirror 54 illustrated in FIG. 6 (refer to FIG. 10).

Figure 10:
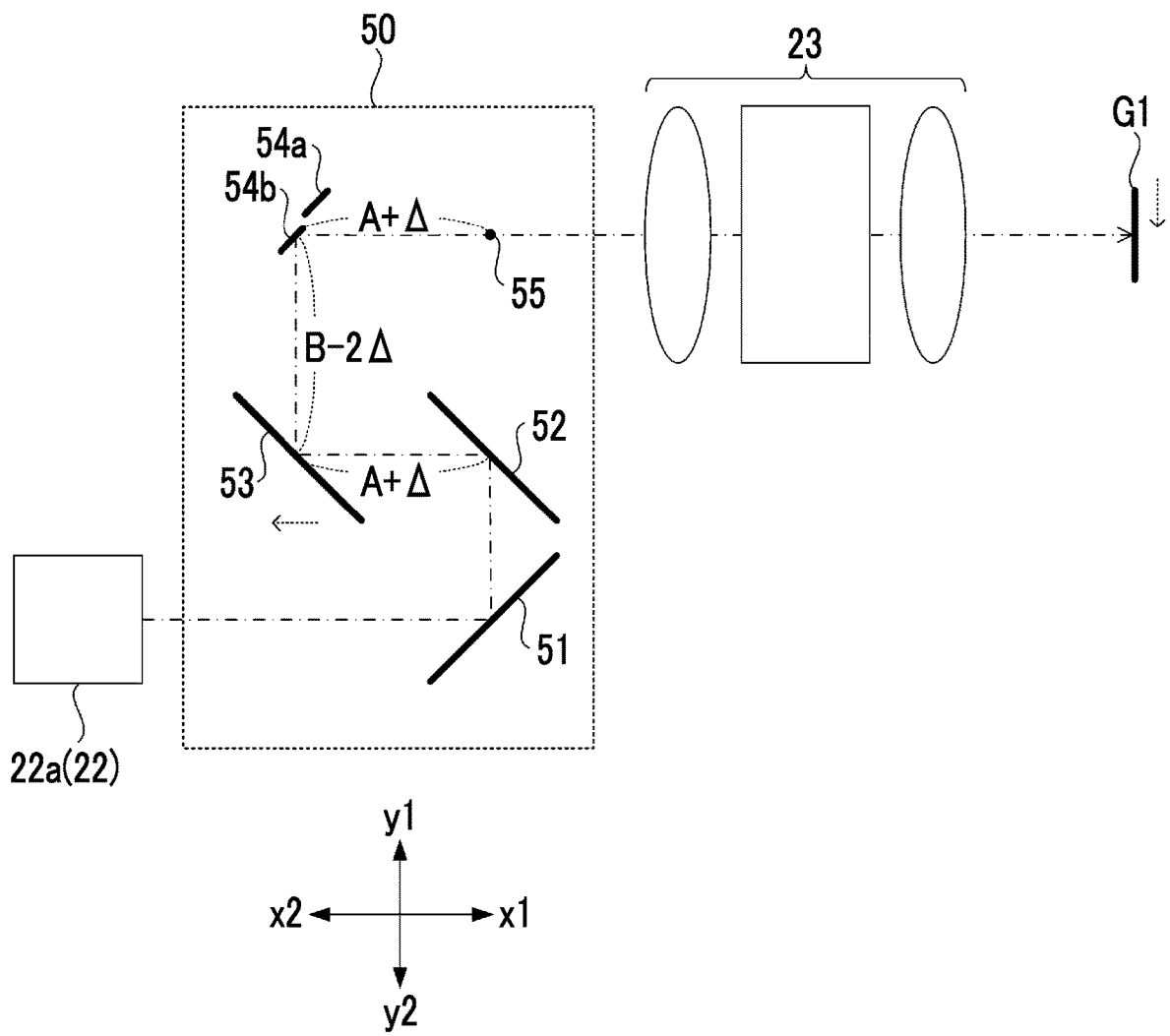
FIG. 10 is a diagram illustrating an example of shifting of the projection range 11 by the second shift mechanism 50 illustrated in FIG. 9.

Shifting of Projection Range 11 by Second Shift Mechanism 50 Illustrated in FIG. 9 FIG. 10 is a diagram illustrating an example of shifting of the projection range 11 by the second shift mechanism 50 illustrated in FIG. 9. In the example in FIG. 10, a control of displacing the third mirror 53 in the direction x2 is performed by the control device 4. Accordingly, the image G1 (that is, the projection range 11) can be shifted in the direction y2.

Specifically, the control device 4 performs a control of displacing the third mirror 53 by Δ in the direction x2. In this case, a transition is made from a state where the light from the third mirror 53 is incident on the fourth mirror 54a to a state where the light from the third mirror 53 is incident on the fourth mirror 54b. Consequently, compared to the state in FIG. 9, the air-equivalent length of the optical path from the second mirror 52 to the third mirror 53 is increased by Δ. The air-equivalent length of the optical path from the third mirror 53 to the fourth mirror 54a or the fourth mirror 54b is decreased by 2Δ. The air-equivalent length of the optical path from the fourth mirror 54 to the imaginary point 55 is increased by Δ.

Thus, in the example in FIG. 10, the air-equivalent length of the optical path from the second mirror 52 to the imaginary point 55 is (A+Δ)+(B−2Δ)+(A+Δ)=2A+B and is the same as in the state in FIG. 9. Thus, in the same manner as in the configuration example in FIG. 5 and FIG. 6 and the configuration example in FIG. 7 and FIG. 8, even in a case where the image G1 is shifted in the direction y, the air-equivalent length of the optical path between the dichroic prism 22a and the projection optical system 23 can be maintained. Accordingly, unintended blurriness or the like of the image G1 due to a change in image forming position of the image G1 in the direction x can be suppressed, and it is possible to shift the projection range 11 while suppressing a decrease in projection quality.

In the configuration example in FIG. 9 and FIG. 10, it is possible to maintain the air-equivalent length of the optical path between the dichroic prism 22a and the projection optical system 23 in a case where the air-equivalent length of the optical path from the second mirror 52 to the third mirror 53 is A, and in a case where the air-equivalent length of the optical path from the second mirror 52 to the third mirror 53 is A+Δ. Thus, as the position of the image G1 (projection range 11), a position at which the air-equivalent length of the optical path from the second mirror 52 to the third mirror 53 is A, and a position at which the air-equivalent length of the optical path from the second mirror 52 to the third mirror 53 is A+Δ may be settable, and a position at which the air-equivalent length of the optical path from the second mirror 52 to the third mirror 53 is between A and A+Δ may not be settable.

Configuration Example 4 of Second Shift Mechanism 50

Figure 11:
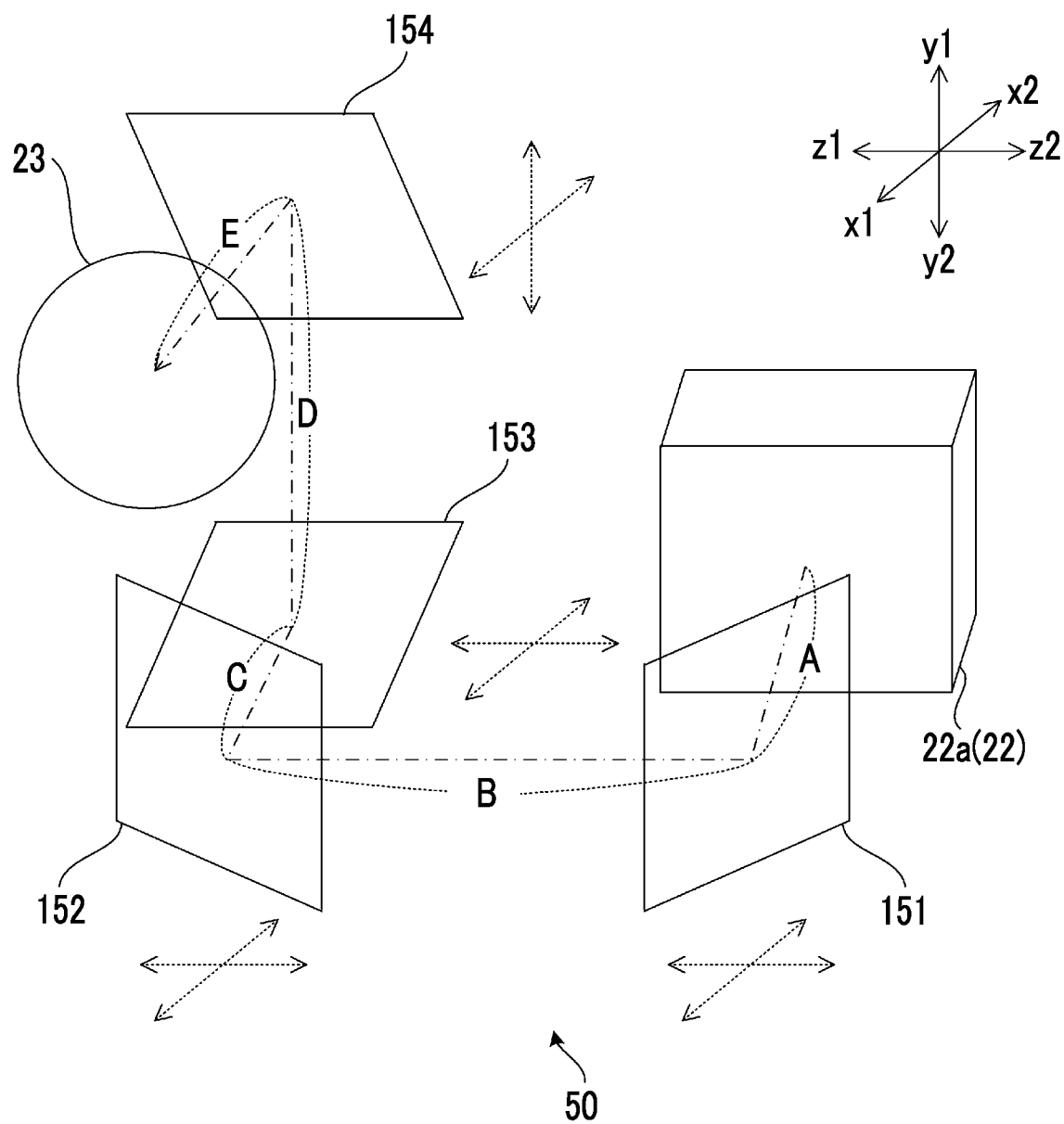
FIG. 11 is a diagram illustrating Configuration Example 4 of a second shift mechanism 50.

FIG. 11 is a diagram illustrating Configuration Example 4 of the second shift mechanism 50. A configuration that can shift the projection range 11 in the direction y and the direction z will be described using FIG. 11. In the example illustrated in FIG. 11, the second shift mechanism 50 comprises a first mirror 151, a second mirror 152, a third mirror 153, and a fourth mirror 154. The first mirror 151, the second mirror 152, the third mirror 153, and the fourth mirror 154 are formed by, for example, applying silver or aluminum to a surface of a substrate of resin.

The first mirror 151 reflects the light that is emitted in the direction x1 from the dichroic prism 22a, at an incidence angle (reflection angle) of 45 degrees to emit the light in the direction z1.

The second mirror 152 reflects the light that is emitted in the direction z1 from the first mirror 151, at an incidence angle of 45 degrees to emit the light in the direction x2. The third mirror 153 reflects the light that is emitted in the direction x2 from the second mirror 152, at an incidence angle of 45 degrees to emit the light in the direction y1. The fourth mirror 154 reflects the light that is emitted in the direction y1 from the third mirror 153, at an incidence angle of 45 degrees to emit the light in the direction x1. The light emitted from the fourth mirror 154 is projected by the projection optical system 23 as the image G1.

The fourth mirror 154 is an example of a first reflective portion for changing the position of the projection range 11 in the direction y (first direction). The second mirror 152 is an example of a second reflective portion for changing the position of the projection range 11 in the direction z (second direction).

In the example in FIG. 11, relative positions of the first mirror 151, the second mirror 152, the third mirror 153, and the fourth mirror 154 with respect to the dichroic prism 22a and the projection optical system 23 are variable. Specifically, the first mirror 151, the second mirror 152, and the third mirror 153 can be displaced in the direction x and the direction z, and the fourth mirror 154 can be displaced in the direction y and the direction x. The displacement of the first mirror 151, the second mirror 152, the third mirror 153, and the fourth mirror 154 is performed by controlling the actuator (for example, a motor), not illustrated, provided in the second shift mechanism 50 by the control device 4.

In the state in FIG. 11, A denotes the air-equivalent length of the optical path from the dichroic prism 22a to the first mirror 151. In the state in FIG. 11, B denotes the air-equivalent length of the optical path from the first mirror 151 to the second mirror 152. In the state in FIG. 11, C denotes the air-equivalent length of the optical path from the second mirror 152 to the third mirror 153. In the state in FIG. 11, D denotes the air-equivalent length of the optical path from the third mirror 153 to the fourth mirror 154. In the state in FIG. 11, E denotes the air-equivalent length of the optical path from the fourth mirror 154 to the projection optical system 23. In this case, the air-equivalent length of the optical path from the dichroic prism 22a to the projection optical system 23 is A+B+C+D+E.

The control device 4 changes (shifts) the position of the image G1 (that is, the projection range 11) in the direction y and the direction z by performing the control of displacing the first mirror 151, the second mirror 152, the third mirror 153, and the fourth mirror 154.

Shifting of Projection Range 11 in Direction y by Second Shift Mechanism 50 Illustrated in FIG. 11

Figure 12:
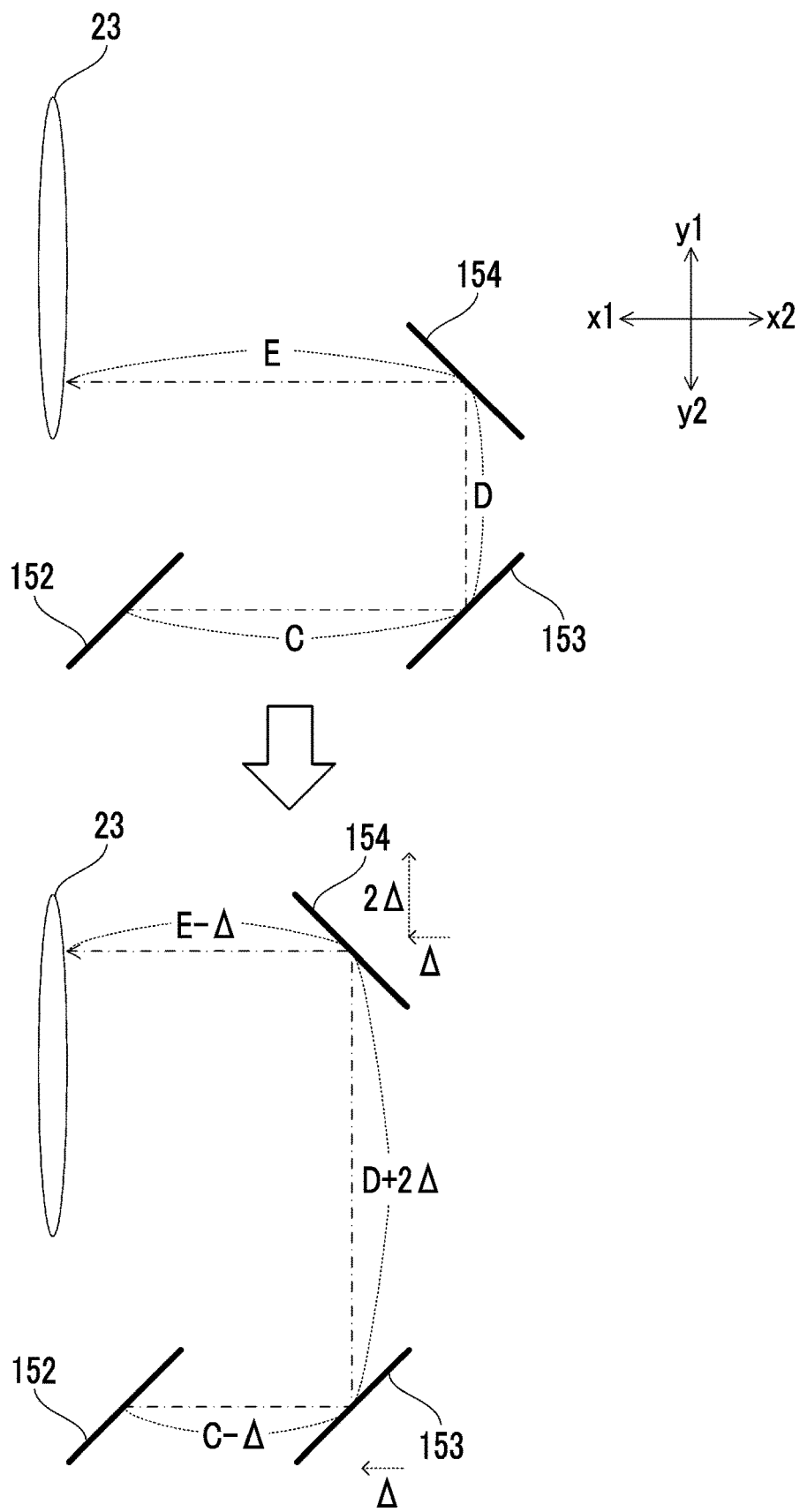
FIG. 12 is a diagram illustrating an example of shifting of the projection range 11 in a direction y by the second shift mechanism 50 illustrated in FIG. 11.

FIG. 12 is a diagram illustrating an example of shifting of the projection range 11 in the direction y by the second shift mechanism 50 illustrated in FIG. 11. FIG. 12 illustrates a state where the second mirror 152, the third mirror 153, the fourth mirror 154, and the projection optical system 23 are seen from the direction z2 toward the direction z1 before and after the shifting of the projection range 11 in the direction y.

An upper part of FIG. 12 illustrates a state before the shifting of the projection range 11 in the direction y and illustrates the same state as FIG. 11. In the state in the upper part of FIG. 12, the air-equivalent length of the optical path from the second mirror 152 to the projection optical system 23 is C+D+E.

A lower part of FIG. 12 illustrates a state after the shifting of the projection range 11 in the direction y. In the example in FIG. 12, a control of displacing the third mirror 153 and the fourth mirror 154 in the direction x1 and displacing the fourth mirror 154 in the direction y1 is performed by the control device 4. Accordingly, the image G1 (projection range 11) can be shifted in the direction y1.

Specifically, the control device 4 performs a control of displacing the third mirror 153 and the fourth mirror 154 by $\Delta$ in the direction x1 and displacing the fourth mirror 154 by 2A in the direction y1. Consequently, compared to the state in FIG. 11, the air-equivalent length of the optical path from the second mirror 152 to the third mirror 153 is decreased by $\Delta$. The air-equivalent length of the optical path from the third mirror 153 to the fourth mirror 154 is increased by 2$\Delta$. The air-equivalent length of the optical path from the fourth mirror 154 to the projection optical system 23 is decreased by $\Delta$.

Thus, in the state in the lower part of FIG. 12, the air-equivalent length of the optical path from the second mirror 152 to the projection optical system 23 is (C−$\Delta$)+(D+2$\Delta$)+(E−$\Delta$)=C+D+E and is the same as in the state in the upper part of FIG. 12 (state in FIG. 11). Thus, in the same manner as in the other configuration examples, even in a case where the image G1 is shifted in the direction y, the air-equivalent length of the optical path between the dichroic prism 22a and the projection optical system 23 can be maintained. Accordingly, unintended blurriness or the like of the image G1 due to a change in image forming position of the image G1 in the direction x can be suppressed, and it is possible to shift the projection range 11 while suppressing a decrease in projection quality.

Shifting of Projection Range 11 in Direction z by Second Shift Mechanism 50 Illustrated in FIG. 11

FIG. 13 is a diagram illustrating an example of shifting of the projection range 11 in the direction z by the second shift mechanism 50 illustrated in FIG. 11. FIG. 13 illustrates a state where the second mirror 152, the third mirror 153, the fourth mirror 154, and the projection optical system 23 are seen from the direction y1 toward the direction y2 before and after the shifting of the projection range 11 in the direction z.

An upper part of FIG. 13 illustrates a state before the shifting of the projection range 11 in the direction z and illustrates the same state as FIG. 11. In the state in the upper part of FIG. 13, the air-equivalent length of the optical path from the dichroic prism 22a to the third mirror 153 is A+B+C.

A lower part of FIG. 13 illustrates a state after the shifting of the projection range 11 in the direction z. In the example in FIG. 13, a control of displacing the first mirror 151 and the second mirror 152 in the direction x1 and displacing the second mirror 152 and the third mirror 153 in the direction z1 is performed by the control device 4. Accordingly, the image G1 (projection range 11) can be shifted in the direction z1.

Specifically, the control device 4 performs a control of displacing the first mirror 151 and the second mirror 152 by $\Delta$ in the direction x1 and displacing the second mirror 152 and the third mirror 153 by 2$\Delta$ in the direction z1. Consequently, compared to the state in FIG. 11, the air-equivalent length of the optical path from the dichroic prism 22a to the first mirror 151 is decreased by $\Delta$. The air-equivalent length of the optical path from the first mirror 151 to the second mirror 152 is increased by 2$\Delta$. The air-equivalent length of the optical path from the second mirror 152 to the third mirror 153 is decreased by $\Delta$.

Thus, in the state in the lower part of FIG. 13, the air-equivalent length of the optical path from the dichroic prism 22a to the third mirror 153 is (A−$\Delta$)+(B+2$\Delta$)+(C−$\Delta$)= A+B+C and is the same as in the state in the upper part of FIG. 13 (state in FIG. 11). Thus, in the same manner as in the other configuration examples, even in a case where the projection range 11 is shifted in the direction z, the air-equivalent length of the optical path between the dichroic prism 22a and the projection optical system 23 can be maintained. Accordingly, unintended blurriness or the like of the image G1 due to a change in image forming position of the image G1 in the direction x can be suppressed, and it is possible to shift the projection range 11 while suppressing a decrease in projection quality.

As illustrated in FIG. 12 and FIG. 13, according to the second shift mechanism 50 illustrated in FIG. 11, the projection range 11 can be shifted in the direction y and the direction z. In addition, the control device 4 may perform both of the shifting of the projection range 11 in the direction y and the shifting of the projection range 11 in the direction z by combining the controls illustrated in FIG. 12 and FIG. 13.

Another Example of Shifting of Projection Range 11 in Direction y by Second Shift Mechanism 50 Illustrated in FIG. 11

Figure 14:
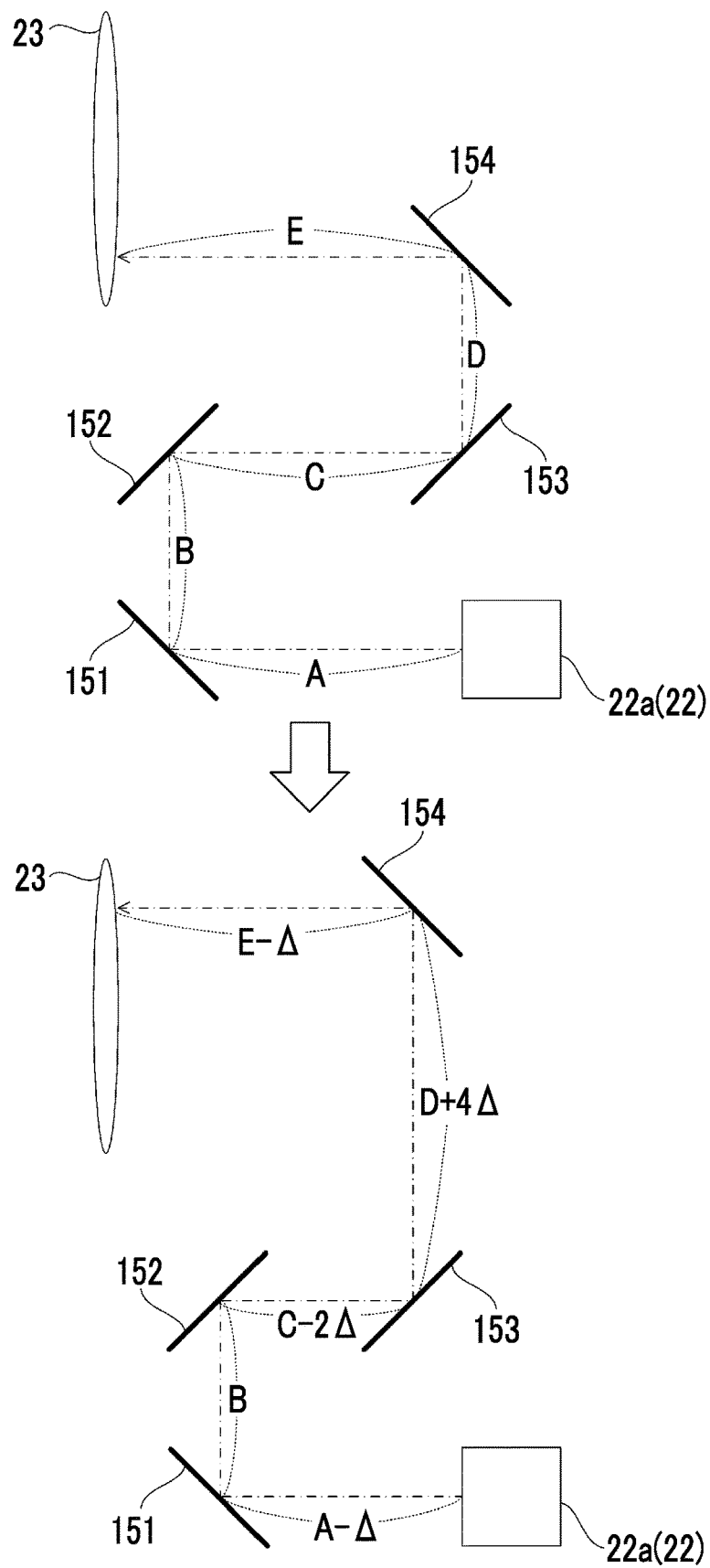
FIG. 14 is a diagram illustrating another example of shifting of the projection range 11 in the direction y by the second shift mechanism 50 illustrated in FIG. 11.

FIG. 14 is a diagram illustrating another example of the shifting of the projection range 11 in the direction y by the second shift mechanism 50 illustrated in FIG. 11. In a case of shifting the projection range 11 in the direction y by increasing the air-equivalent length of the optical path from the third mirror 153 to the fourth mirror 154, a control of maintaining the entire air-equivalent length by decreasing the air-equivalent length of the optical path from the second mirror 152 to the third mirror 153 and the air-equivalent length of the optical path from the fourth mirror 154 to the projection optical system 23 is described using FIG. 12. However, the control of maintaining the entire air-equivalent length is not limited thereto.

FIG. 14 illustrates the optical path from the dichroic prism 22a to the first mirror 151, the optical path from the first mirror 151 to the second mirror 152, the optical path from the second mirror 152 to the third mirror 153, and the optical path from the third mirror 153 to the projection optical system 23 before and after the shifting of the projection range 11 in the direction y in plan view.

An upper part of FIG. 14 illustrates a state before the shifting of the projection range 11 in the direction y and illustrates the same state as FIG. 11. In the state in the upper part of FIG. 14, the air-equivalent length of the optical path from the dichroic prism 22a to the projection optical system 23 is A+B+C+D+E.

A lower part of FIG. 14 illustrates a state after the shifting of the projection range 11 in the direction y. In the example in FIG. 14, the control device 4 performs a control of displacing the fourth mirror 154 by 4A in the direction y1, displacing the third mirror 153 and the fourth mirror 154 by $\Delta$ in the direction x1, and displacing the first mirror 151 and the second mirror 152 by $\Delta$ in the direction x2. Accordingly, the image G1 (projection range 11) can be shifted by 4A in the direction y1.

In the state in the lower part of FIG. 14, the air-equivalent length of the optical path from the dichroic prism 22a to the projection optical system 23 is (A−$\Delta$)+B+(C−2$\Delta$)+(D+4$\Delta$)+ (E−$\Delta$)=A+B+C+D+E and is the same as in the state in the upper part of FIG. 14. Thus, in the same manner as in the other configuration examples, even in a case where the image G1 is shifted in the direction y, the air-equivalent length of the optical path between the dichroic prism 22a and the projection optical system 23 can be maintained. Accordingly, unintended blurriness or the like of the image G1 due to a change in image forming position of the image G1 in the direction x can be suppressed, and it is possible to shift the projection range 11 while suppressing a decrease in projection quality.

As illustrated in FIG. 14, in a case of shifting the projection range 11 in the direction y, a displacement amount of each mirror can be decreased by maintaining the air-equivalent length of the optical path by displacing not only the third mirror 153 and the fourth mirror 154 but also the first mirror 151 and the second mirror 152.

Another Example of Shifting of Projection Range 11 in Direction z by Second Shift Mechanism 50 Illustrated in FIG. 11

Figure 15:
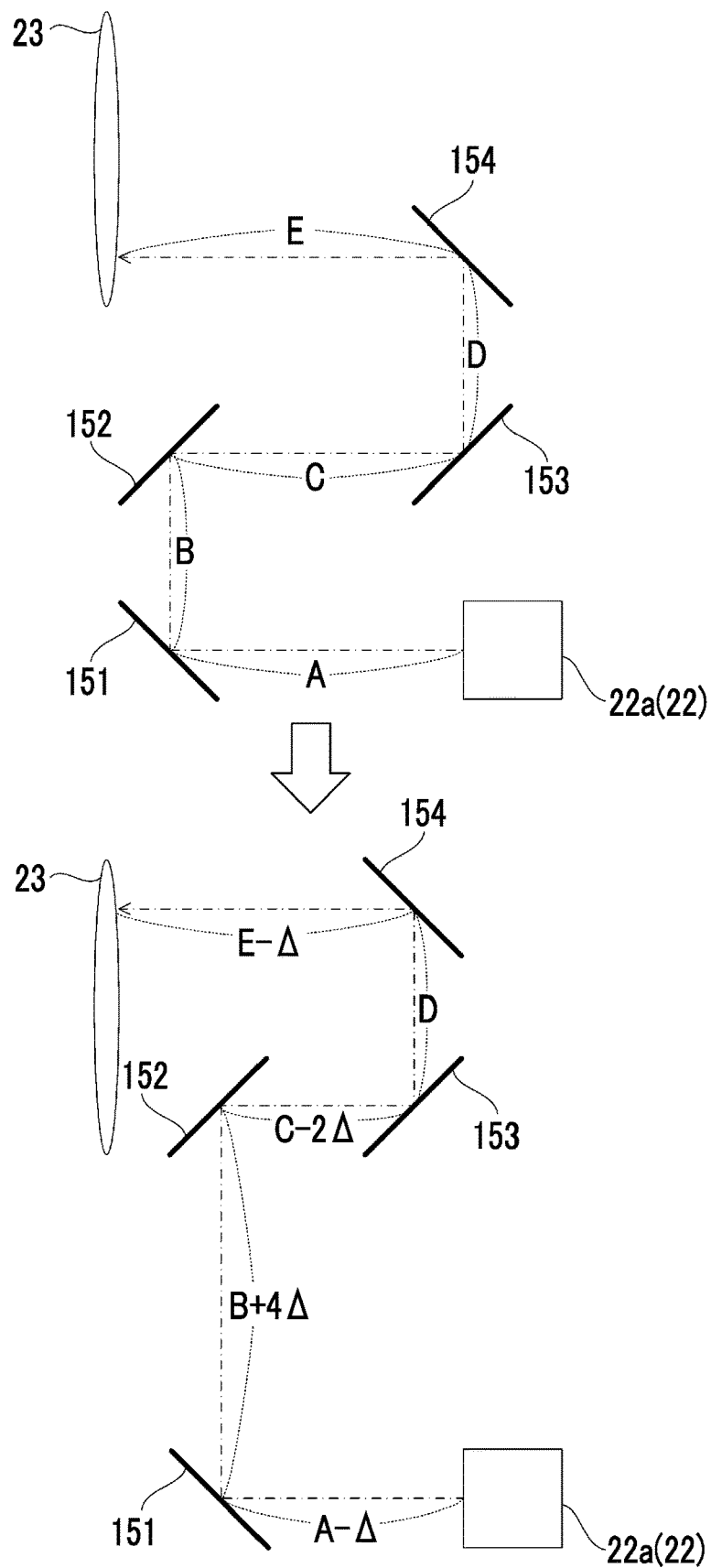
FIG. 15 is a diagram illustrating another example of shifting of the projection range 11 in the direction z by the second shift mechanism 50 illustrated in FIG. 11.

FIG. 15 is a diagram illustrating another example of the shifting of the projection range 11 in the direction z by the second shift mechanism 50 illustrated in FIG. 11. For example, in a case of shifting the projection range 11 in the direction z by increasing the air-equivalent length of the optical path from the first mirror 151 to the second mirror 152, a control of maintaining the entire air-equivalent length by decreasing the air-equivalent length of the optical path from the dichroic prism 22a to the first mirror 151 and the air-equivalent length of the optical path from the second mirror 152 to the third mirror 153 is described using FIG. 13. However, the control of maintaining the entire air-equivalent length is not limited thereto.

FIG. 15 illustrates the optical path from the dichroic prism 22a to the first mirror 151, the optical path from the first mirror 151 to the second mirror 152, the optical path from the second mirror 152 to the third mirror 153, and the optical path from the third mirror 153 to the projection optical system 23 before and after the shifting of the projection range 11 in the direction z in plan view.

An upper part of FIG. 15 illustrates a state before the shifting of the projection range 11 in the direction z and illustrates the same state as FIG. 11. In the state in the upper part of FIG. 15, the air-equivalent length of the optical path from the dichroic prism 22a to the projection optical system 23 is A+B+C+D+E.

A lower part of FIG. 15 illustrates a state after the shifting of the projection range 11 in the direction z. In the example in FIG. 15, the control device 4 performs a control of displacing the second mirror 152, the third mirror 153, and the fourth mirror 154 by 4A in the direction z1, displacing the third mirror 153 and the fourth mirror 154 by 4A in the direction z1, displacing the first mirror 151 and the second mirror 152 by Δ in the direction x2, and displacing the third mirror 153 and the fourth mirror 154 by Δ in the direction x1. Accordingly, the image G1 (projection range 11) can be shifted by 4Δ in the direction z1.

In the state in the lower part of FIG. 15, the air-equivalent length of the optical path from the dichroic prism 22a to the projection optical system 23 is (A−Δ)+(B+4Δ)+(C−2Δ)+D+(E−Δ)=A+B+C+D+E and is the same as in the state in the upper part of FIG. 15. Thus, in the same manner as in the other configuration examples, even in a case where the projection range 11 is shifted in the direction z, the air-equivalent length of the optical path between the dichroic prism 22a and the projection optical system 23 can be maintained. Accordingly, unintended blurriness or the like of the image G1 due to a change in image forming position of the image G1 in the direction x can be suppressed, and it is possible to shift the projection range 11 while suppressing a decrease in projection quality.

As illustrated in FIG. 15, in a case of shifting the projection range 11 in the direction z, the displacement amount of each mirror can be decreased by maintaining the air-equivalent length of the optical path by displacing not only the first mirror 151, the second mirror 152, and the third mirror 153 but also the fourth mirror 154.

Combination of Each Control Performed by Control Device 4

The controls illustrated in FIG. 12 and FIG. 13 are performed by displacing a relatively small number of reflective portions by a relatively large amount. Thus, the displacement amounts of the reflective portions with respect to the shift amount of the projection range 11 are large, and the projection range 11 can be shifted with high accuracy. Meanwhile, the controls illustrated in FIG. 14 and FIG. 15 are performed by displacing a relatively large number of reflective portions by a relatively small amount. Thus, the projection range 11 can be shifted at a high speed.

Thus, the control device 4 may first shift the projection range 11 at a high speed by the controls illustrated in FIG. 14 and FIG. 15 as coarse adjustment and then, shift the projection range 11 with high accuracy by the controls illustrated in FIG. 12 and FIG. 13 as fine adjustment.

Design of Second Shift Mechanism 50

In a case where a width in which the image G1 can be shifted in the direction y is referred to as a V shift width, and a width in which the image G1 can be shifted in the direction z is referred to as an H shift width, the second shift mechanism 50 illustrated in FIG. 12 and FIG. 13 is designed to satisfy, for example, Expression (1) below.

$$A\max \geq V \text{ shift width}/2$$

$$B\max \geq V \text{ shift width}$$

$$C\max \geq (V \text{ shift width} + H \text{ shift width})/2$$

$$D\max \geq H \text{ shift width}$$

$$E\max \geq H \text{ shift width}/2 \qquad (1)$$

In addition, the second shift mechanism 50 illustrated in FIG. 14 and FIG. 15 is designed to satisfy, for example, Expression (2) below.

$$A\max \geq (V \text{ shift width} + H \text{ shift width})/3$$

$$B\max \geq V \text{ shift width}$$

$$C\max \geq (V \text{ shift width} + H \text{ shift width})/3$$

$$D\max \geq H \text{ shift width}$$

$$E\max \geq (V \text{ shift width} + H \text{ shift width})/3 \qquad (2)$$

In Expression (1) and Expression (2), Amax is the maximum value of a distance between the dichroic prism 22a and the first mirror 151. Bmax is the maximum value of a distance between the first mirror 151 and the second mirror 152. Cmax is the maximum value of a distance between the second mirror 152 and the third mirror 153. Dmax is the maximum value of a distance between the third mirror 153 and the fourth mirror 154. Emax is the maximum value of a distance between the fourth mirror 154 and the projection optical system 23.

Configuration Example 5 of Second Shift Mechanism 50

Figure 16:
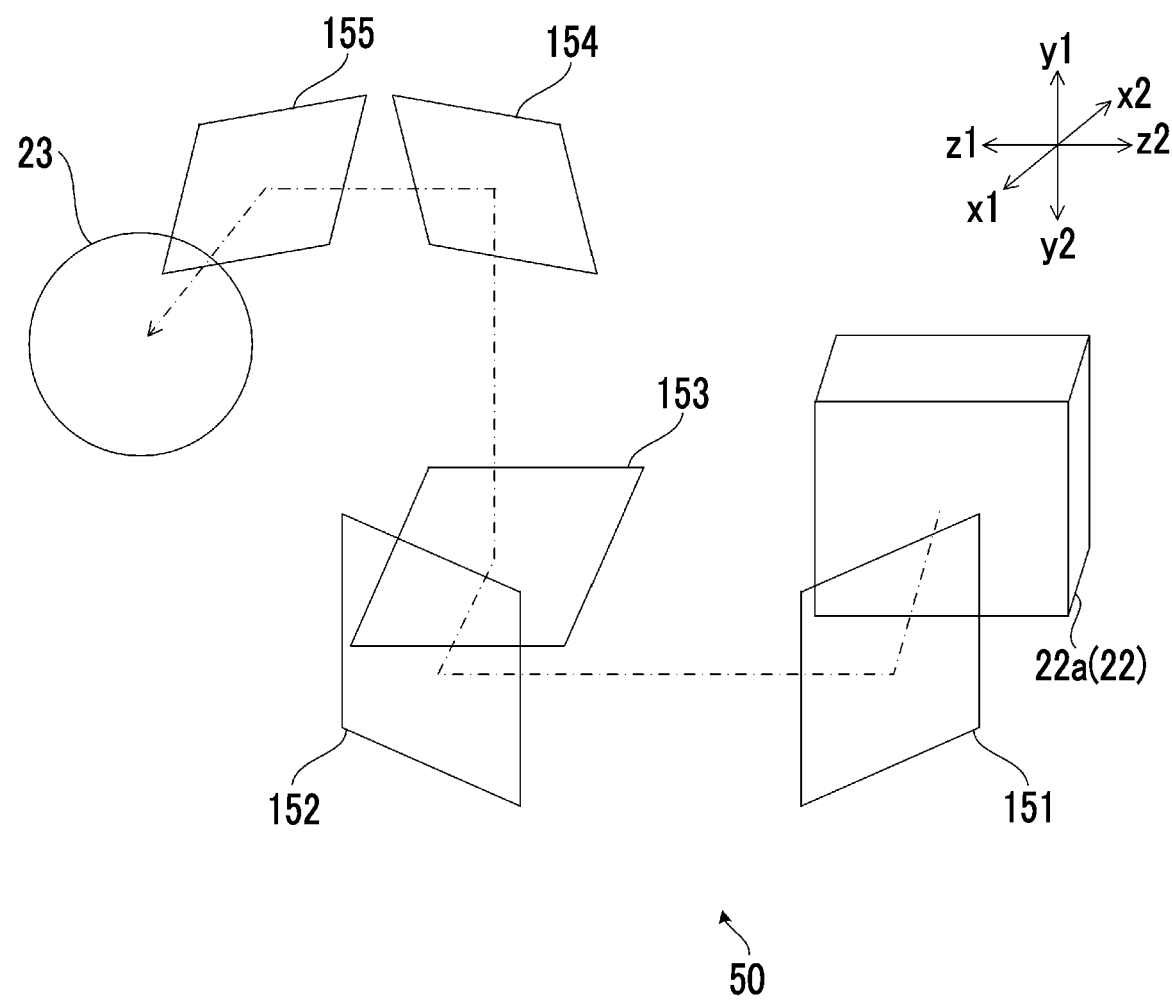
FIG. 16 is a diagram illustrating Configuration Example 5 of a second shift mechanism 50.

FIG. 16 is a diagram illustrating Configuration Example 5 of the second shift mechanism 50. A configuration in which the second shift mechanism 50 comprises the first mirror 151, the second mirror 152, the third mirror 153, and the fourth mirror 154 is described using FIG. 11 to FIG. 15 as the configuration that can shift the projection range 11 in the direction y and the direction z. However, the present invention is not limited to such a configuration.

For example, as illustrated in FIG. 16, the second shift mechanism 50 may comprise a fifth mirror 155 in addition to the first mirror 151, the second mirror 152, the third mirror 153, and the fourth mirror 154. The fourth mirror 154 reflects the light that is emitted in the direction y1 from the third mirror 153, to emit the light in the direction z1. The fifth mirror 155 reflects the light that is emitted in the direction z1 from the fourth mirror 154, to emit the light in the direction x1. The light emitted from the fifth mirror 155 is projected by the projection optical system 23 as the image G1.

While a configuration of providing the fifth mirror 155 between the fourth mirror 154 and the projection optical system 23 is described, the fifth mirror 155 may be configured to be provided between the dichroic prism 22a and the first mirror 151. The fifth mirror 155 may be configured to be provided between the second mirror 152 and the third mirror 153. The fifth mirror 155 may be configured to be provided between the third mirror 153 and the fourth mirror 154.

Each configuration example of the second shift mechanism 50 can also be embodied in combination. For example, in the second shift mechanism 50 illustrated in FIG. 11, a direction in which a part of the reflective portions can be displaced may be limited as illustrated in FIG. 7 and FIG. 8, or a part of the reflective portions may be separated and fixedly positioned as illustrated in FIG. 9 and FIG. 10. In addition, the control device 4 may perform a control for performing displacement of each reflective portion while maintaining the air-equivalent length of the optical path from the light modulation portion 22 to the projection optical system 23.

Dual Screen Projection Performed by Projection Apparatus 10

Figure 17:
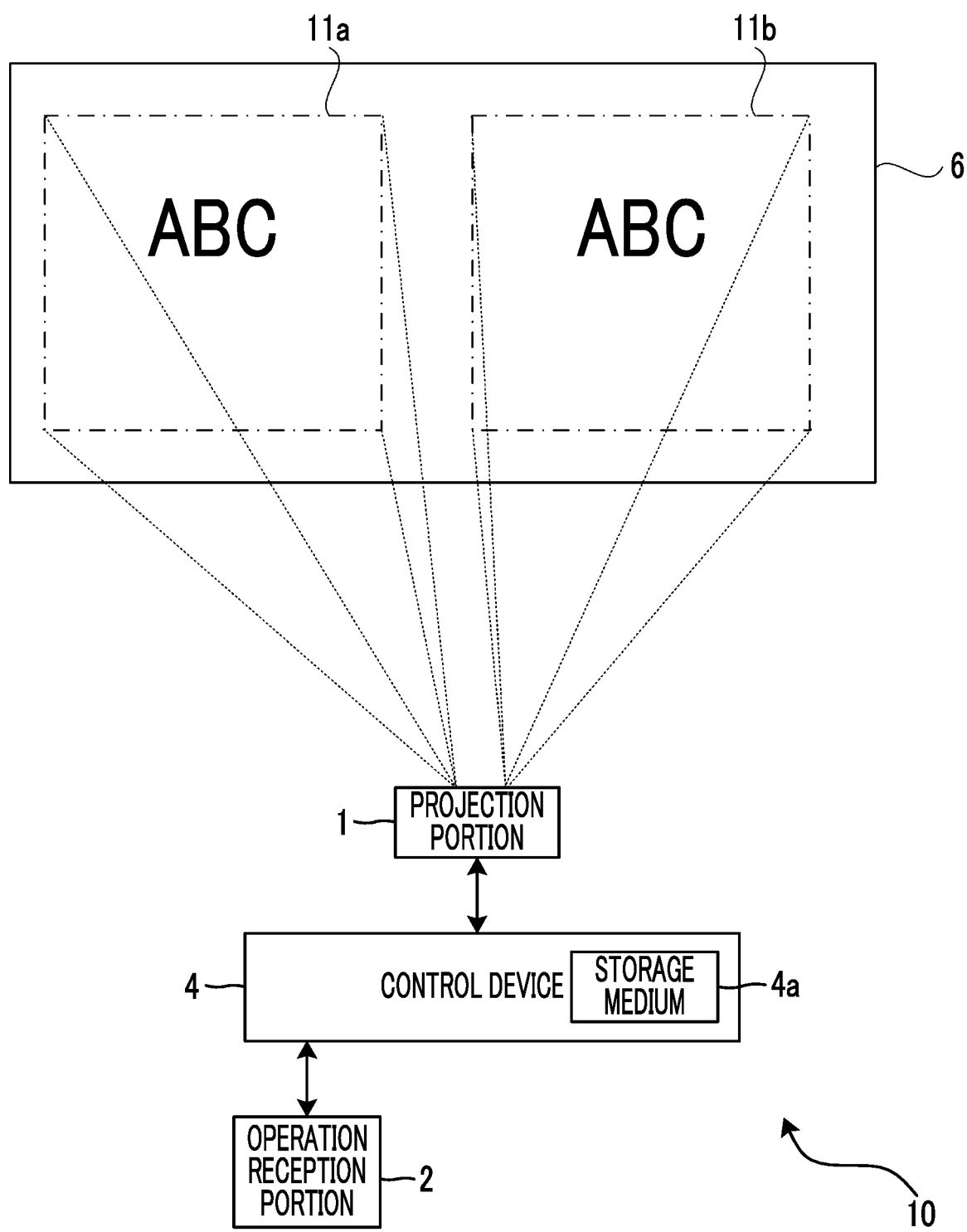
FIG. 17 is a diagram illustrating an example of dual screen projection performed by the projection apparatus 10.

FIG. 17 is a diagram illustrating an example of dual screen projection performed by the projection apparatus 10. The projection apparatus 10 may be capable of projecting a plurality of images to the projection target object 6. Projection ranges 11a and 11b illustrated in FIG. 17 are two regions that are irradiated with the projection light by the projection portion 1 in the projection target object 6. In the example in FIG. 17, the same image (character string of "ABC") is projected to the projection ranges 11a and 11b.

In the example in FIG. 17, both of the projection ranges 11a and 11b are projection ranges in the projection target object 6. However, the projection ranges 11a and 11b may be projection ranges in different projection target objects.

Figure 18:
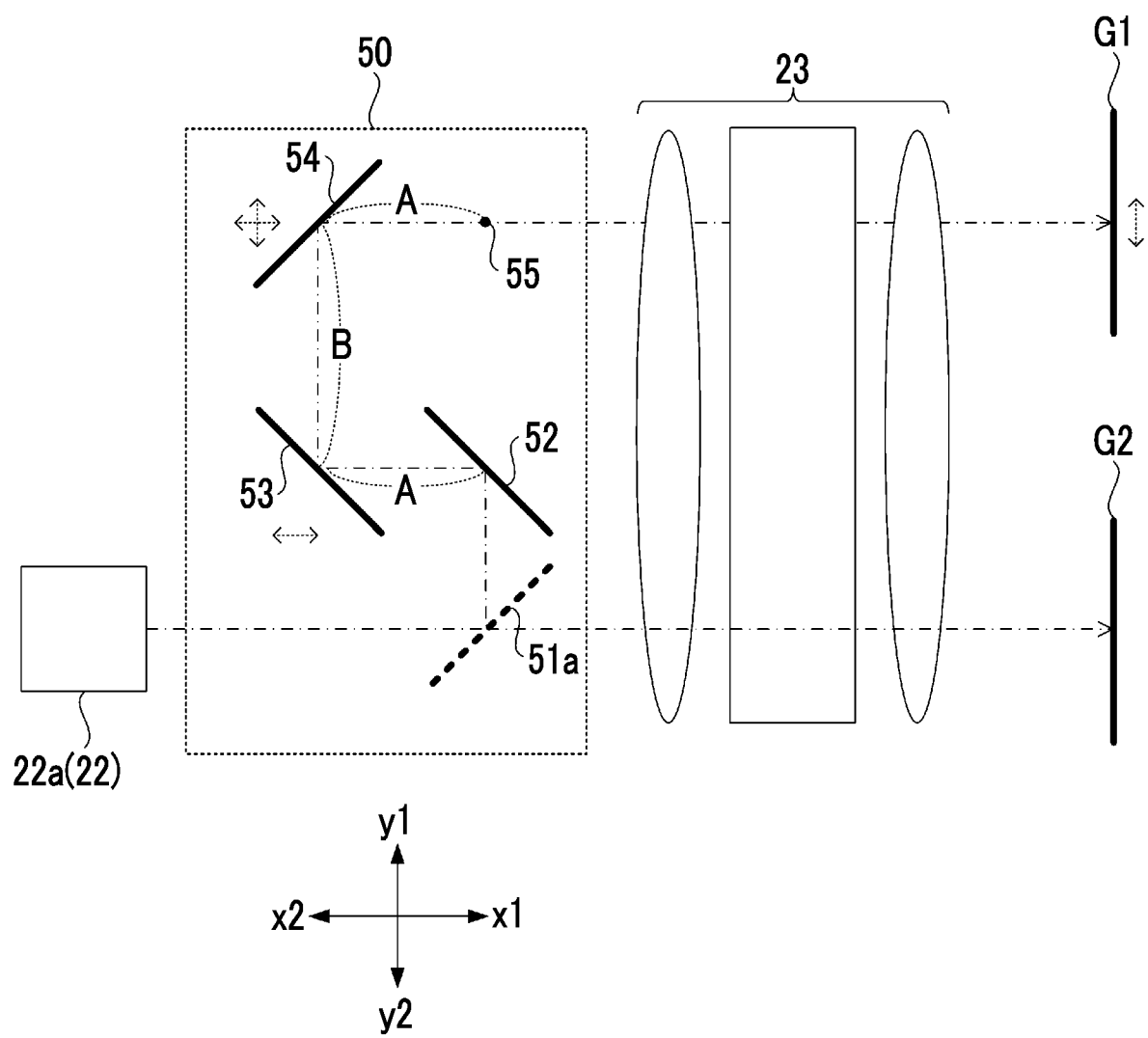
FIG. 18 is a diagram illustrating an example of a configuration of the projection apparatus 10 that performs the dual screen projection.
Figure 19:
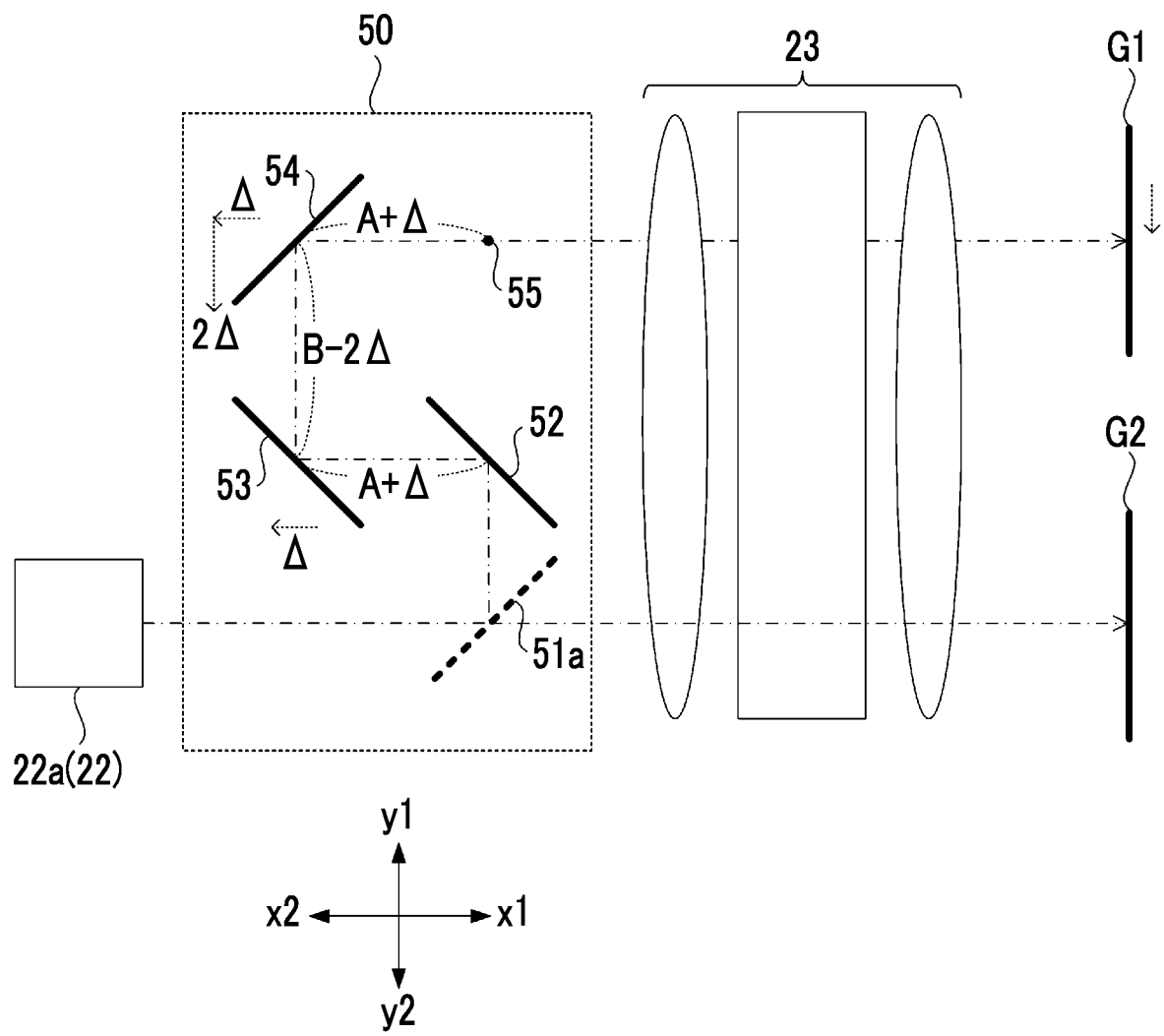
FIG. 19 is a diagram illustrating an example of shifting of the projection range 11 by the second shift mechanism 50 illustrated in FIG. 18.

Configuration of Projection Apparatus 10 that Performs Dual Screen Projection FIG. 18 is a diagram illustrating an example of a configuration of the projection apparatus 10 that performs the dual screen projection. FIG. 19 is a diagram illustrating an example of shifting of the projection range 11 by the second shift mechanism 50 illustrated in FIG. 18.

The projection apparatus 10 illustrated in FIG. 18 and FIG. 19 comprises a half-silvered mirror 51a instead of the first mirror 51 illustrated in FIG. 5. The half-silvered mirror 51a is an example of a branch member that causes the optical image modulated by the light modulation portion 22 (light modulation element) to branch. The half-silvered mirror 51a reflects a part of the light emitted in the direction x1 from the dichroic prism 22a to emit the light in the direction y1 (second mirror 52) and transmits the rest of the light emitted in the direction x1 from the dichroic prism 22a to emit the light in the direction x1.

The image G1 is an image projected to the projection range 11a illustrated in FIG. 17. An image G2 is an image projected to the projection range 11b illustrated in FIG. 17. The light (first light) emitted in the direction y1 from the half-silvered mirror 51a is reflected by the second mirror 52, the third mirror 53, and the fourth mirror 54 and is projected by the projection optical system 23 as the image G1. Meanwhile, the light (second light) emitted in the direction x1 from the half-silvered mirror 51a is projected by the projection optical system 23 as the image G2.

In such a manner, by causing the light emitted from the dichroic prism 22a to branch by the half-silvered mirror 51a, the images G1 and G2 can be projected to the projection ranges 11a and 11b, respectively. In addition, by a configuration in which the common projection optical system 23 projects each light branching by the half-silvered mirror 51a, it is possible to suppress size increase of the projection apparatus 10 and easily achieve uniform projection quality of the images G1 and G2, compared to a configuration in which a plurality of projection optical systems 23 are provided in order to project each light branching by the half-silvered mirror 51a.

In addition, as illustrated in FIG. 19, the image G1 can be displaced in the direction y by the second shift mechanism 50. Thus, a relative positional relationship (for example, an interval) between the images G1 and G2 (projection ranges 11a and 11b) can be adjusted.

Furthermore, according to the second shift mechanism 50, since a change in image forming position of the image G1 in the direction x can be suppressed even in a case where the image G1 is displaced in the direction y, unintended variations in projection quality (for example, variations in focus) of the images G1 and G2 can be suppressed. Thus, it is possible to adjust the relative positional relationship between the images G1 and G2 while suppressing a decrease in projection quality.

Figure 20:
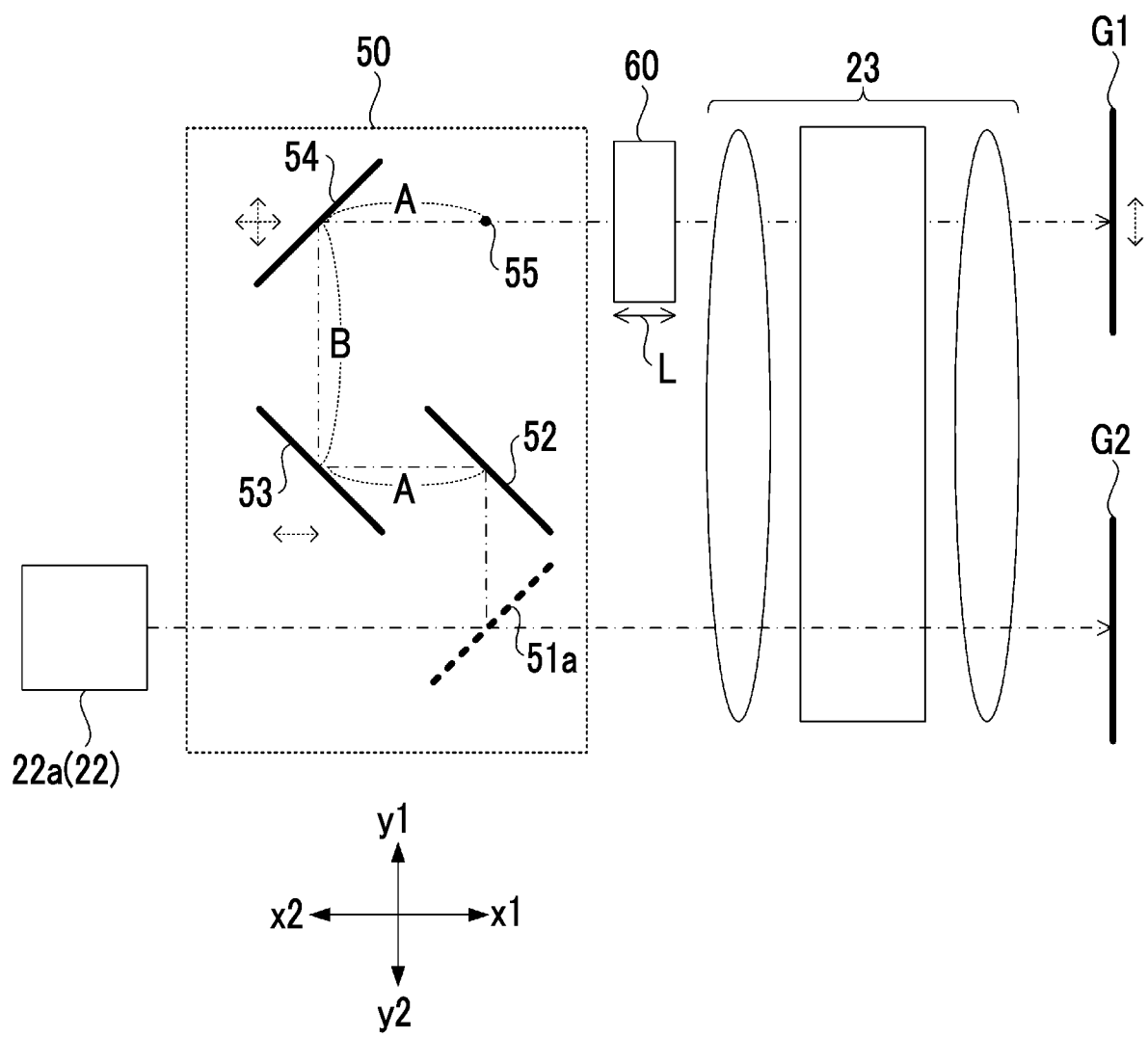
FIG. 20 is a diagram illustrating another example of the configuration of the projection apparatus 10 that performs the dual screen projection.

Another Example of Configuration of Projection Apparatus 10 that Performs Dual Screen Projection FIG. 20 is a diagram illustrating another example of the configuration of the projection apparatus 10 that performs the dual screen projection. An optical member 60 may be further provided in the projection apparatus 10 illustrated in FIG. 18 and FIG. 19. The optical member 60 is a member that has a refractive index greater than 1 and transmits light, and is, for example, a glass member. In the example in FIG. 20, the optical member 60 is provided on the optical path from the fourth mirror 54 to the projection optical system 23.

Here, a path of the first light (light reflected by the half-silvered mirror 51a) between the half-silvered mirror 51a and the projection optical system 23 is longer than a path of the second light (light transmitted through the half-silvered mirror 51a) between the half-silvered mirror 51a and the projection optical system 23 by a path of passing through the second mirror 52, the third mirror 53, and the fourth mirror 54.

Meanwhile, the air-equivalent length of this path of the first light can be decreased by providing the optical member 60 on the path of the first light between the half-silvered mirror 51a and the projection optical system 23. The refractive index and a thickness (length in the passage direction of the light) of the optical member 60 are designed such that the air-equivalent length of the path of the first light almost matches the air-equivalent length of the path of the second light.

Accordingly, since it is possible to equalize the air-equivalent lengths of the paths of each branching light before reaching the projection optical system 23 while using a configuration in which each light branching by the half-silvered mirror 51a is projected by the common projection optical system 23, unintended variations in projection quality (for example, variations in focus) of the images G1 and G2 due to different lengths of each path can be suppressed.

Another Example of Dual Screen Projection Performed by Projection Apparatus 10

Figure 21:
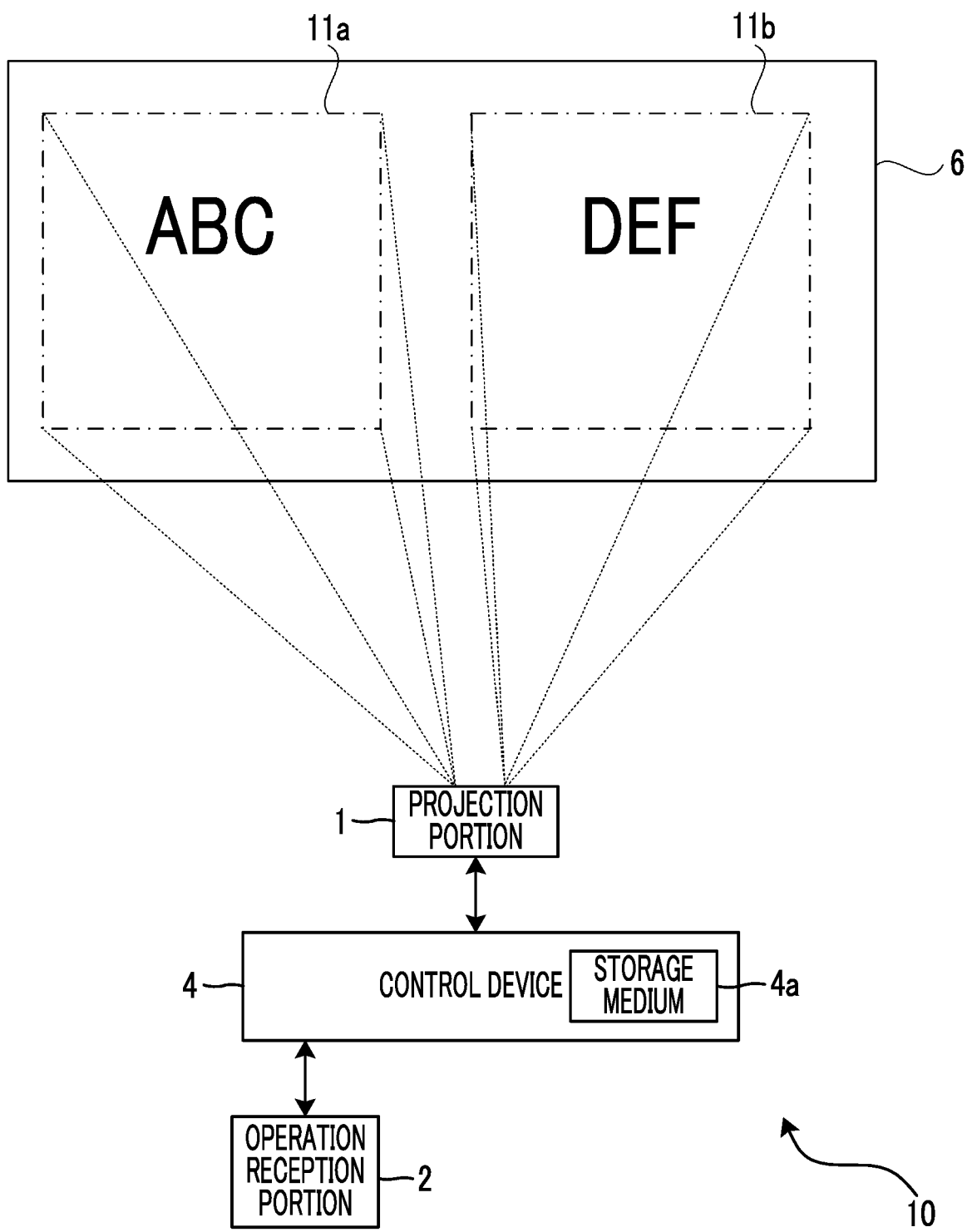
FIG. 21 is a diagram illustrating another example of the dual screen projection performed by the projection apparatus 10.

FIG. 21 is a diagram illustrating another example of the dual screen projection performed by the projection apparatus 10. As illustrated in FIG. 21, the projection apparatus 10 may be configured to be capable of projecting different images to the projection ranges 11a and 11b. In the example in FIG. 21, an image including the character string "ABC" is projected to the projection range 11a, and an image including a character string "DEF" is projected to the projection range 11b.

For example, in the configuration of the projection apparatus 10 illustrated in FIG. 18 to FIG. 20, a half-silvered mirror having a variable transmittance depending on an applied voltage or the like is used as the half-silvered mirror 51a. The control device 4 performs a control of high speed switching between a first state (transmittance is almost 0%) where the half-silvered mirror 51a does not transmit the light and reflects the light, and a second state (transmittance is almost 100%) where the half-silvered mirror 51a transmits the light. In addition, the control device 4 performs a control of emitting the optical image to be projected to the projection range 11a from the light modulation portion 22 in the first state, and emitting the optical image to be projected to the projection range 11b from the light modulation portion 22 in the second state. Accordingly, the projection to the projection range 11a and the projection to the projection range 11b can be performed in a time-division manner, and different images can be projected to the projection ranges 11a and 11b.

However, a configuration that can project different images to the projection ranges 11a and 11b is not limited thereto. For example, the first mirror 51 of which a position and an angle can be switched may be configured to be provided instead of the half-silvered mirror 51a. The control device 4 performs a control of high speed switching between the first state where the first mirror 51 reflects the light, and the second state where the first mirror 51 does not reflect the light. In addition, the control device 4 performs a control of emitting the optical image to be projected to the projection range 11a from the light modulation portion 22 in the first state, and emitting the optical image to be projected to the projection range 11b from the light modulation portion 22 in the second state. Accordingly, the projection to the projection range 11a and the projection to the projection range 11b can be performed in a time-division manner, and different images can be projected to the projection ranges 11a and 11b.

In addition, a polarization member that reflects light of first polarized light to emit the light of the first polarized light in the direction y1 and transmits light of second polarized light different from the first polarized light to emit the light of the second polarized light in the direction x1 may be configured to be provided instead of the half-silvered mirror 51a. In addition, the light modulation portion 22 is configured to be capable of emitting an optical image of the first polarized light and an optical image of the second polarized light by switching therebetween. The control device 4 performs a control of high speed switching between a state where the optical image of the first polarized light to be projected to the projection range 11a is emitted from the light modulation portion 22, and a state where the optical image of the second polarized light to be projected to the projection range 11b is emitted from the light modulation portion 22. Accordingly, the projection to the projection range 11a and the projection to the projection range 11b can be performed in a time-division manner, and different images can be projected to the projection ranges 11a and 11b.

While an example in which Configuration Example 1 of the second shift mechanism 50 illustrated in FIG. 5 and FIG. 6 is configured to enable the dual screen projection is described using FIG. 18 to FIG. 20, other configuration examples of the second shift mechanism 50 may be configured to enable the dual screen projection.

Modification Example 1

While a configuration in which the first shift mechanism 105 and the second shift mechanism 50 are comprised as shift mechanisms is described, the first shift mechanism 105 may be configured to be omitted in the projection apparatus 10. Even in this case, the projection range 11 can be shifted by the second shift mechanism 50.

Modification Example 2

While a configuration in which the second shift mechanism 50 is provided at a position between the light modulation portion 22 and the opening 15a in the body part 101 is described, the position at which the second shift mechanism 50 is provided is not limited thereto. For example, in the configuration of the projection apparatus 10 illustrated in FIG. 4, the second shift mechanism 50 may be provided at a position between the opening 2a and the first optical system 121 in the first member 102.

Modification Example 3

While a configuration of bending the optical axis K twice using the reflective member 122 and the reflective member 32 is described as the configuration of the projection apparatus 10 using FIG. 3 and FIG. 4, the optical axis K may be configured to be not bent by omitting the reflective member 122 and the reflective member 32. Alternatively, the optical axis K may be configured to be bent once by omitting any of the reflective member 122 and the reflective member 32.

Figure 22:
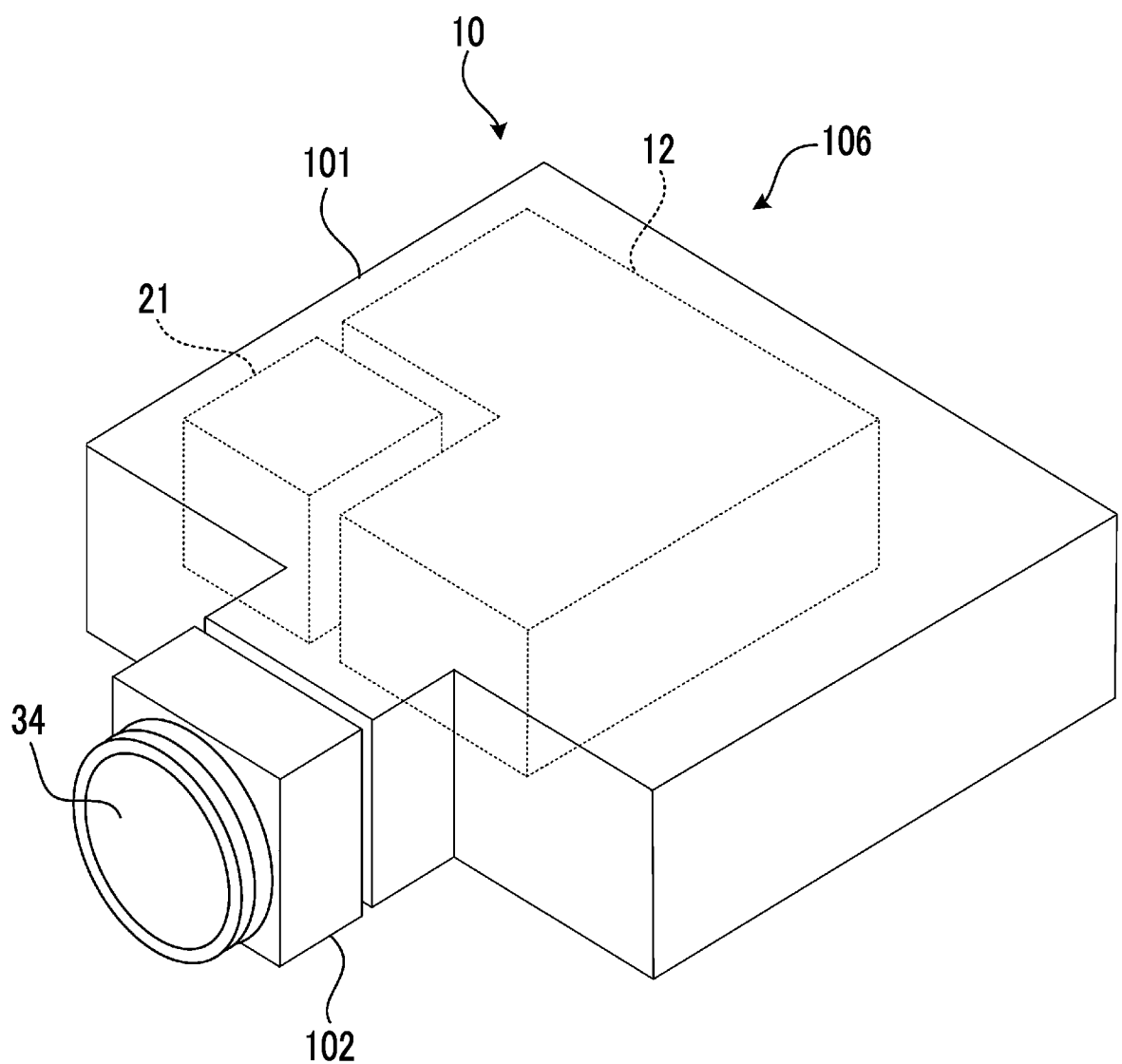
FIG. 22 is a schematic diagram illustrating another exterior configuration of the projection apparatus 10.
Figure 23:
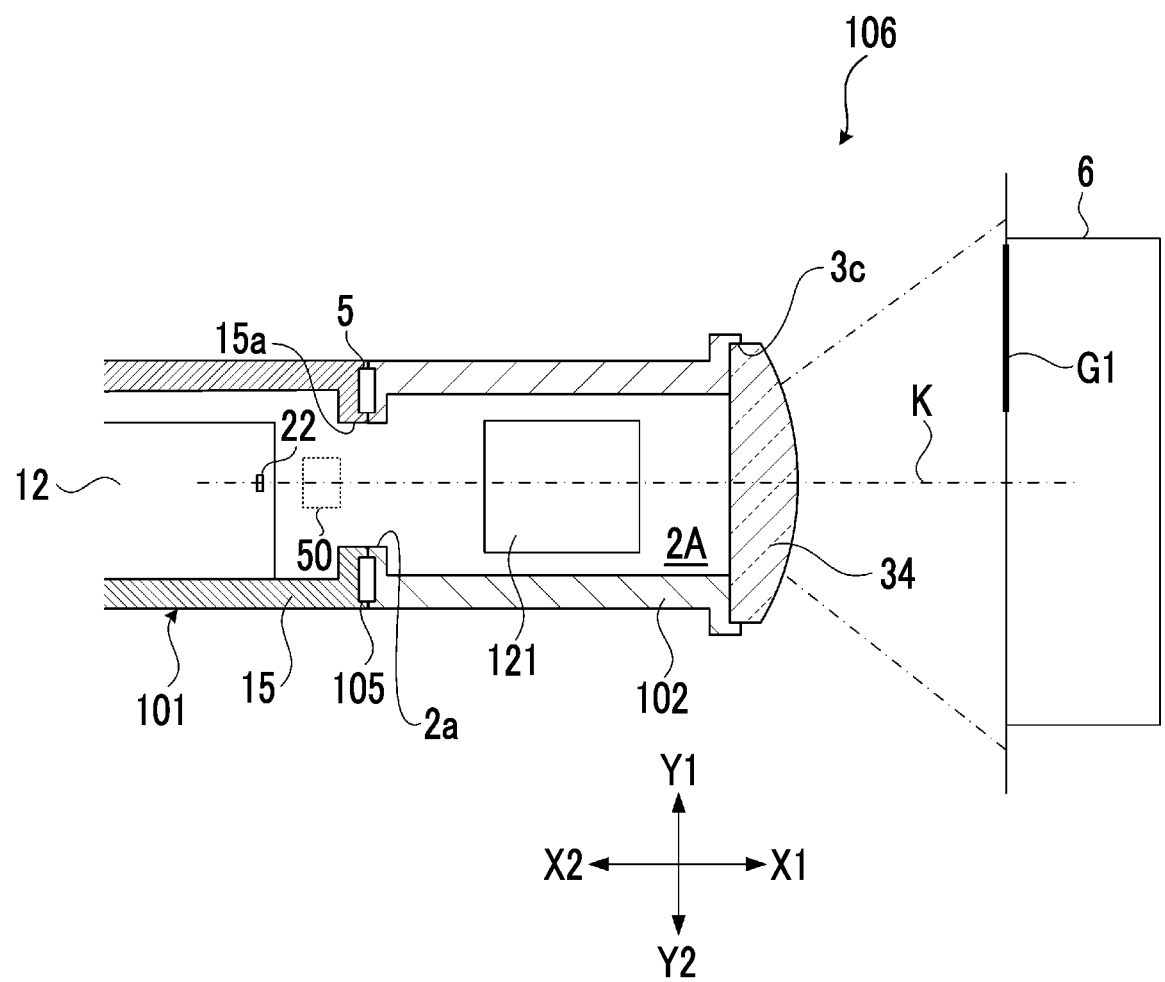
FIG. 23 is a schematic cross-sectional view of the optical unit 106 of the projection apparatus 10 illustrated in FIG. 22.

FIG. 22 is a schematic diagram illustrating another exterior configuration of the projection apparatus 10. FIG. 23 is a schematic cross-sectional view of the optical unit 106 of the projection apparatus 10 illustrated in FIG. 22. In FIG. 22 and FIG. 23, the same parts as the parts illustrated in FIG. 3 and FIG. 4 will be designated by the same reference numerals and will not be described.

The optical unit 106 illustrated in FIG. 22 comprises the first member 102 supported by the body part 101 and does not comprise the second member 103 illustrated in FIG. 3 and FIG. 4. In addition, the optical unit 106 illustrated in FIG. 22 does not comprise the reflective member 122, the second optical system 31, the reflective member 32, the third optical system 33, and the projection direction changing mechanism 104 illustrated in FIG. 3 and FIG. 4.

In the optical unit 106 illustrated in FIG. 22, the projection optical system 23 illustrated in FIG. 2 is composed of the first optical system 121 and the lens 34. The optical axis K of this projection optical system 23 is illustrated in FIG. 23. The first optical system 121 and the lens 34 are arranged in this order from the light modulation portion 22 side along the optical axis K.

The first optical system 121 guides the light that is incident on the first member 102 from the body part 101 and travels in the direction X1, to the lens 34. The lens 34 is arranged in an end part of the body part 101 on the direction X1 side in the form of closing the opening 3c formed in this end part. The lens 34 projects the light incident from the first optical system 121 to the projection target object 6.

REFERENCE

Figure 24:
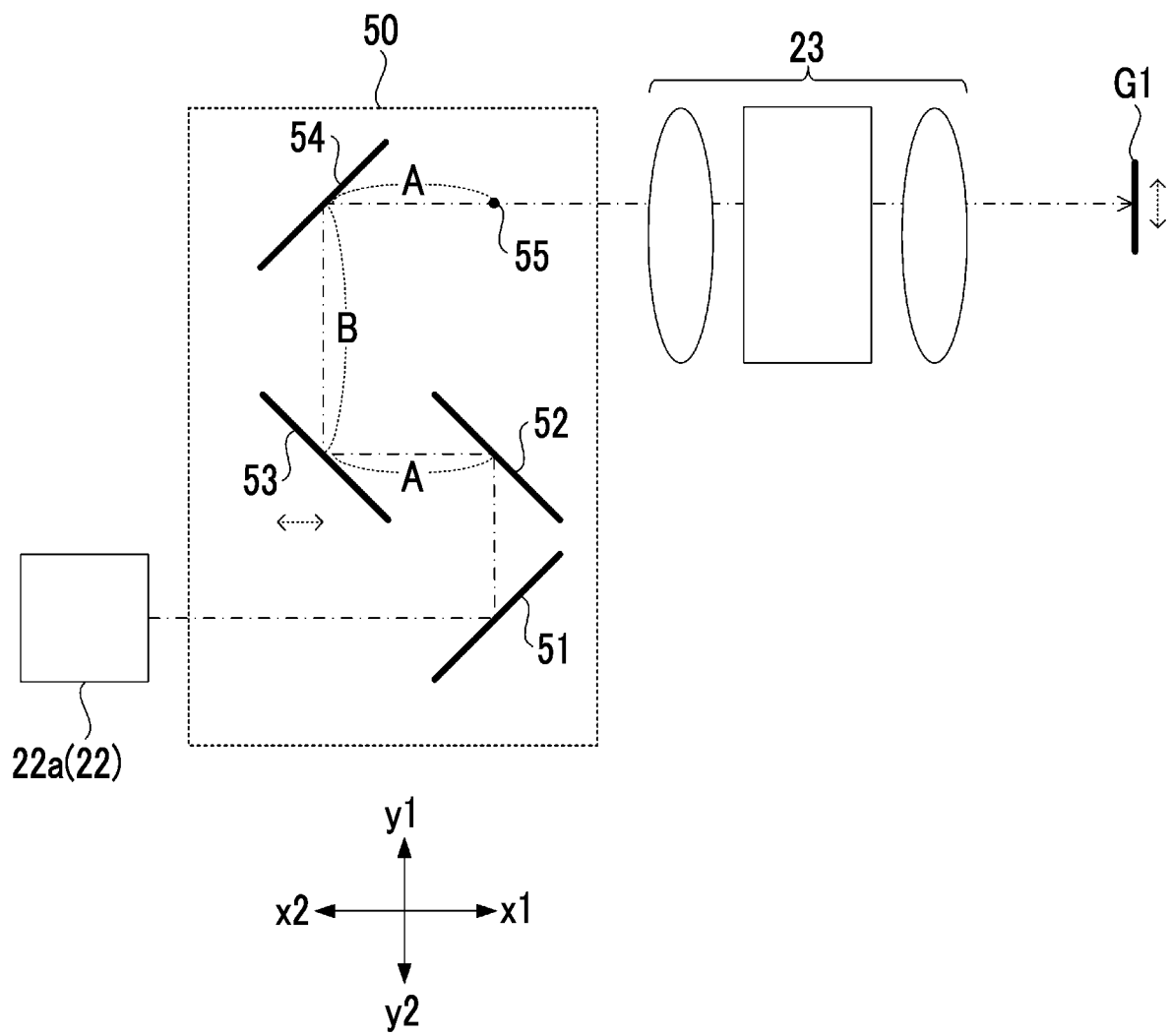
FIG. 24 is a diagram illustrating an example of a configuration of the second shift mechanism 50 that cannot maintain an air-equivalent length when shifting the projection range 11 for reference.

FIG. 24 is a diagram illustrating an example of a configuration of the second shift mechanism 50 that cannot maintain the air-equivalent length when shifting the projection range 11 for reference. The second shift mechanism 50 illustrated in FIG. 24 has a configuration in which the fourth mirror 54 cannot be displaced in the second shift mechanism 50 illustrated in FIG. 5.

FIG. 25 is a diagram illustrating an example of shifting of the projection range 11 by the second shift mechanism 50 illustrated in FIG. 24 for reference. In the example in FIG. 25, the control device 4 performs a control of displacing the third mirror 53 by $\Delta$ in the direction x2. In this case, compared to the state in FIG. 24, the air-equivalent length of the optical path from the second mirror 52 to the third mirror 53 is increased by $\Delta$. The air-equivalent length of the optical path from the third mirror 53 to the fourth mirror 54 is decreased by $\Delta$. The air-equivalent length of the optical path from the fourth mirror 54 to the imaginary point 55 is increased by $\Delta$.

Thus, in the example in FIG. 25, the air-equivalent length of the optical path from the second mirror 52 to the imaginary point 55 is $(A+\Delta)+(B-\Delta)+(A+\Delta)=2A+B+\Delta$ and is different from in the state in FIG. 24. Accordingly, in a case where the image G1 is shifted in the direction y by transitioning from the state in FIG. 24 to the state in FIG. 25, the air-equivalent length of the optical path between the dichroic prism 22a and the projection optical system 23 changes. Thus, unintended defocusing (for example, blurriness) of the image G1 due to a change in image forming position of the image G1 in the direction x occurs.

In such a manner, in a case where only one reflective portion among the plurality of reflective portions (for example, the first mirror 51, the second mirror 52, the third mirror 53, and the fourth mirror 54) arranged between the light modulation portion 22 and the projection optical system 23 is configured to be displaceable, it is not possible to maintain the air-equivalent length when shifting the projection range 11 unless the other reflective portions that cannot be displaced are separated as discontinuous configurations as in, for example, the configuration example illustrated in FIG. 9 and FIG. 10. Meanwhile, according to each configuration example of the second shift mechanism 50, it is possible to maintain the air-equivalent length when shifting the projection range 11.

At least the following matters are disclosed in the present specification.

(1) A projection apparatus comprising an irradiation portion that performs irradiation with light, a light modulation element that modulates the light from the irradiation portion, a plurality of reflective portions that reflect an optical image modulated by the light modulation element, and a projection optical system that projects the optical image reflected by the plurality of reflective portions to a projection surface, in which the plurality of reflective portions are arranged between the light modulation element and the projection optical system.

(2) The projection apparatus according to (1), further comprising a processor, in which the processor is configured to perform a control of changing a position of a projection range of the optical image by displacing at least one of the plurality of reflective portions.

(3) The projection apparatus according to (2), in which the processor is configured to perform the control such that an air-equivalent length of a path of the optical image between the light modulation element and the projection optical system has a specific value.

(4) The projection apparatus according to (2) or (3), further comprising a setting portion that sets the position of the projection range, in which the processor is configured to perform the control based on the position set by the setting portion.

(5) The projection apparatus according to any one of (2) to (4), in which the processor is configured to perform the control in a state where an air-equivalent length of a path of the optical image between the light modulation element and the projection optical system is maintained.

(6) The projection apparatus according to (5), in which the processor is configured to perform the control by displacing the plurality of reflective portions in a coordinating manner.

(7) The projection apparatus according to (5) or (6), in which the processor is configured to perform the control by repeating processing of displacing the plurality of reflective portions.

(8) The projection apparatus according to (5) or (6), in which the processor is configured to perform the control by displacing the plurality of reflective portions at the same time.

(9) The projection apparatus according to any one of (2) to (8), in which the plurality of reflective portions include a first reflective portion for changing the position of the projection range in a first direction and a second reflective portion for changing the position of the projection range in a second direction different from the first direction.

(10) The projection apparatus according to any one of (1) to (9), further comprising a branch member that causes the optical image modulated by the light modulation element to branch, in which the plurality of reflective portions reflect first light out of the optical image branching by the branch member, and the projection optical system projects the first light reflected by the plurality of reflective portions to the projection surface.

(11) The projection apparatus according to (10), in which the projection optical system projects the first light and second light different from the first light out of the optical image branching by the branch member to the projection surface.

(12) The projection apparatus according to (11), further comprising an optical member that is provided on a path of the first light and has a refractive index and a thickness with which an air-equivalent length of the path of the first light between the branch member and the projection optical system and an air-equivalent length of a path of the second light between the branch member and the projection optical system are equalized.

(13) The projection apparatus according to any one of (1) to (12), in which the plurality of reflective portions have four or more reflecting surfaces on which the optical image is reflected.

(14) The projection apparatus according to any one of (1) to (13), further comprising a prism, in which the prism is arranged between the plurality of reflective portions and the light modulation element.

(15) A control method by a projection apparatus including an irradiation portion that performs irradiation with light, a light modulation element that modulates the light from the irradiation portion, a plurality of reflective portions that reflect an optical image modulated by the light modulation element, a projection optical system that projects the optical image reflected by the plurality of reflective portions to a projection surface, and a processor, the control method comprising arranging the plurality of reflective portions between the light modulation element and the projection optical system, and performing, by the processor, a control of changing a position of a projection range of the optical image by displacing at least one of the plurality of reflective portions.

(16) The control method according to (15), in which the processor is configured to perform the control such that an air-equivalent length of a path of the optical image between the light modulation element and the projection optical system has a specific value.

(17) The control method according to (15) or (16), in which the projection apparatus includes a setting portion that sets the position of the projection range, and the processor is configured to perform the control based on the position set by the setting portion.

(18) The control method according to any one of (15) to (17), in which the processor is configured to perform the control in a state where an air-equivalent length of a path of the optical image between the light modulation element and the projection optical system is maintained.

(19) The control method according to (18), in which the processor is configured to perform the control by displacing the plurality of reflective portions in a coordinating manner.

(20) The control method according to (18) or (19), in which the processor is configured to perform the control by repeating processing of displacing the plurality of reflective portions.

(21) The control method according to (18) or (19), in which the processor is configured to perform the control by displacing the plurality of reflective portions at the same time.

(22) The control method according to any one of (15) to (21), in which the plurality of reflective portions include a first reflective portion for changing the position of the projection range in a first direction and a second reflective portion for changing the position of the projection range in a second direction different from the first direction.

(23) The control method according to any one of (15) to (22), in which the projection apparatus further includes a branch member that causes the optical image modulated by the light modulation element to branch, the plurality of reflective portions reflect first light out of the optical image branching by the branch member, and the projection optical system projects the first light reflected by the plurality of reflective portions to the projection surface.

(24) The control method according to (23), in which the projection optical system projects the first light and second light different from the first light out of the optical image branching by the branch member to the projection surface.

(25) The control method according to (24), in which the projection apparatus includes an optical member on a path of the first light, the optical member having a refractive index and a thickness with which an air-equivalent length of the path of the first light between the branch member and the projection optical system and an air-equivalent length of a path of the second light between the branch member and the projection optical system are equalized.

(26) The control method according to any one of (15) to (25), in which the plurality of reflective portions have four or more reflecting surfaces on which the optical image is reflected.

(27) The control method according to any one of (15) to (26), in which the projection apparatus further includes a prism, and the prism is arranged between the plurality of reflective portions and the light modulation element.

EXPLANATION OF REFERENCES

1: projection portion
2: operation reception portion
2A, 3A: hollow portion
2a, 2b, 3a, 3c, 15a: opening
4: control device
4a: storage medium
6: projection target object
10: projection apparatus
11, 11a, 11b: projection range
12: light modulation unit
15: housing
21: light source
22: light modulation portion
22a: dichroic prism
23: projection optical system
24: control circuit
31: second optical system
32, 122: reflective member
33: third optical system
34: lens
50: second shift mechanism
51, 151: first mirror
51a: half-silvered mirror
52, 152: second mirror
53, 153: third mirror
54, 54a, 54b, 154: fourth mirror
55: imaginary point
60: optical member
101: body part
102: first member
103: second member
104: projection direction changing mechanism
105: first shift mechanism
106: optical unit
121: first optical system
155: fifth mirror
G1, G2: image

What is claimed is:

1. A projection apparatus comprising:
a processor;
an irradiation portion that performs irradiation with light;
a light modulation element that modulates the light from the irradiation portion;
a plurality of reflective portions that reflect an optical image modulated by the light modulation element; and
a projection optical system that projects the optical image reflected by the plurality of reflective portions to a projection surface, wherein the plurality of reflective portions are arranged between the light modulation element and the projection optical system,
wherein the processor is configured to perform a control of changing a position of a projection range of the optical image by displacing at least one of the plurality of reflective portions, and
wherein the processor is configured to perform the control such that an air-equivalent length of a path of the optical image between the light modulation element and the projection optical system has a specific value.

2. The projection apparatus according to claim 1, further comprising:
a setting portion that sets the position of the projection range,
wherein the processor is configured to perform the control based on the position set by the setting portion.

3. The projection apparatus according to claim 1,
wherein the processor is configured to perform the control in a state where an air-equivalent length of a path of the optical image between the light modulation element and the projection optical system is maintained.

4. The projection apparatus according to claim 3,
wherein the processor is configured to perform the control by displacing the plurality of reflective portions in a coordinating manner.

5. The projection apparatus according to claim 3,
wherein the processor is configured to perform the control by repeating processing of displacing the plurality of reflective portions.

6. The projection apparatus according to claim 3,
wherein the processor is configured to perform the control by displacing the plurality of reflective portions simultaneously.

7. The projection apparatus according to claim 1,
wherein the plurality of reflective portions include a first reflective portion for changing the position of the projection range in a first direction and a second reflective portion for changing the position of the projection range in a second direction different from the first direction.

8. The projection apparatus according to claim 1, further comprising:
a branch member that causes the optical image modulated by the light modulation element to branch,
wherein the plurality of reflective portions reflect first light of the optical image branched by the branch member, and
the projection optical system projects the first light reflected by the plurality of reflective portions to the projection surface.

9. The projection apparatus according to claim 8,
wherein the projection optical system projects the first light and second light of the optical image branched by the branch member to the projection surface, the second light being different from the first light.

10. The projection apparatus according to claim 9, further comprising:
an optical member that is provided on a path of the first light and has a refractive index and a thickness with which an air-equivalent length of the path of the first light between the branch member and the projection optical system and an air-equivalent length of a path of the second light between the branch member and the projection optical system are equalized.

11. The projection apparatus according to claim 1,
wherein the plurality of reflective portions have four or more reflecting surfaces on which the optical image is reflected.

12. A control method by a projection apparatus including an irradiation portion that performs irradiation with light, an irradiation portion that performs irradiation with light, a light modulation element that modulates the light from the irradiation portion, a plurality of reflective portions that reflect an optical image modulated by the light modulation element, a projection optical system that projects the optical image reflected by the plurality of reflective portions to a projection surface, and a processor, the control method comprising:
arranging the plurality of reflective portions between the light modulation element and the projection optical system; and
performing, by the processor, a control of changing a position of a projection range of the optical image by displacing at least one of the plurality of reflective portions,
wherein the processor is configured to perform the control such that an air-equivalent length of a path of the optical image between the light modulation element and the projection optical system has a specific value.

13. The control method according to claim 12,
wherein the projection apparatus includes a setting portion that sets the position of the projection range, and
the processor is configured to perform the control based on the position set by the setting portion.

14. The control method according to claim 12,
wherein the processor is configured to perform the control in a state where an air-equivalent length of a path of the optical image between the light modulation element and the projection optical system is maintained.

15. The control method according to claim 14,
wherein the processor is configured to perform the control by displacing the plurality of reflective portions in a coordinating manner.

16. The control method according to claim 14,
wherein the processor is configured to perform the control by repeating processing of displacing the plurality of reflective portions.

17. The control method according to claim 14,
wherein the processor is configured to perform the control by displacing the plurality of reflective portions simultaneously.

18. The control method according to claim 12,
wherein the plurality of reflective portions include a first reflective portion for changing the position of the projection range in a first direction and a second reflective portion for changing the position of the projection range in a second direction different from the first direction.

19. The control method according to claim 12,
wherein the projection apparatus further includes a branch member that causes the optical image modulated by the light modulation element to branch,
the plurality of reflective portions reflect first light of the optical image branched by the branch member, and
the projection optical system projects the first light reflected by the plurality of reflective portions to the projection surface.

20. The control method according to claim 19,
wherein the projection optical system projects the first light and second light of the optical image branched by the branch member to the projection surface, the second light being different from the first light.

21. The control method according to claim 20, wherein an optical member is provided on a path of the first light, the optical member having a refractive index and a thickness with which an air-equivalent length of the path of the first light between the branch member and the projection optical system and an air-equivalent length of a path of the second light between the branch member and the projection optical system are equalized.

22. The control method according to claim 12, wherein the plurality of reflective portions have four or more reflecting surfaces on which the optical image is reflected.

* * * * *